United States Patent

Takahashi et al.

[11] Patent Number: 5,905,875
[45] Date of Patent: May 18, 1999

[54] MULTIPROCESSOR SYSTEM CONNECTED BY A DUPLICATED SYSTEM BUS HAVING A BUS STATUS NOTIFICATION LINE

[75] Inventors: Hajime Takahashi; Nobuhisa Hattori, both of Kawasaki; Toshihide Tsuzuki, Yokohama; Jun Funaki, Kawasaki, all of Japan

[73] Assignee: Fujitsu Limited, Kawasaki, Japan

[21] Appl. No.: 08/592,512

[22] Filed: Jan. 26, 1996

[30] Foreign Application Priority Data

Apr. 28, 1995 [JP] Japan ................................ 7-105906

[51] Int. Cl.⁶ .................................................. G06F 13/00
[52] U.S. Cl. ................... 395/281; 395/800.01; 395/561; 395/306
[58] Field of Search ...................... 395/281, 325, 395/425, 182.07, 800, 182, 557, 561, 306, 440; 364/200, 131; 371/9

[56] References Cited

U.S. PATENT DOCUMENTS 4,130,865 12/1978 Heart et al. ............................ 364/200
4,965,717 10/1990 Cutts, Jr. et al. ...................... 364/200
5,388,224 2/1995 Maskas .................................. 395/325
5,388,242 2/1995 Jewett .................................... 395/425
5,581,770 12/1996 Suzuki ................................... 395/733
5,588,111 12/1996 Cutts, Jr. et al. .................. 395/182.07
5,590,299 12/1996 Bennett ................................. 395/405

*Primary Examiner*—Ayaz R. Sheikh
*Assistant Examiner*—Eric S. Thlang
*Attorney, Agent, or Firm*—Armstrong, Westerman, Hattori, McLeland, & Naughton

[57] ABSTRACT

A multiprocessor system having the capability of increasing the speed of a bus clock while retaining high reliability and fault tolerant performance as well as utilizing the current operating system resources. The multiprocessor system is made up of a plurality of processor modules connected together through a duplicated system bus. The duplicated system bus is divided into a plurality of segments, and these segments are coupled together by at least one bus extender mechanism. The multiprocessor system is also provided with first notification means which is provided between bus control mechanisms for controlling the states of physical buses and the bus extender mechanism, and the bus control mechanisms and the bus extender mechanism are mutually notified of the state of each mechanism through the first notification means.

15 Claims, 19 Drawing Sheets

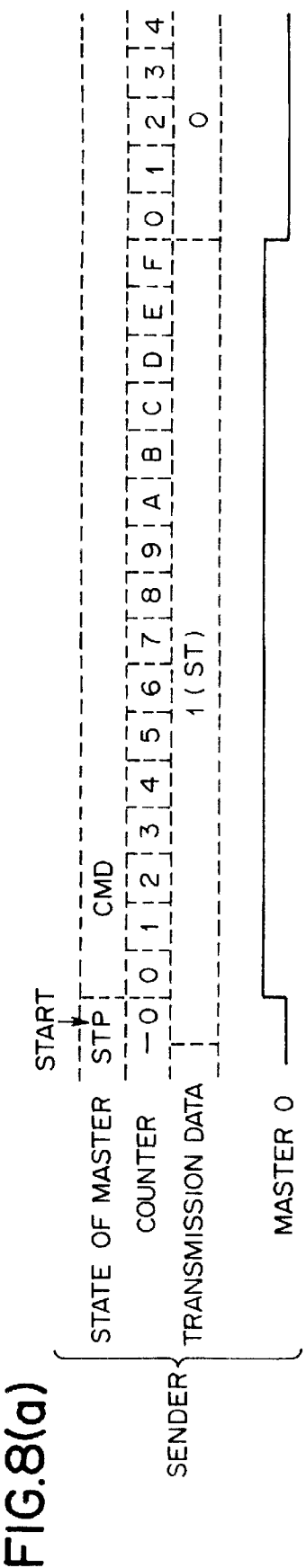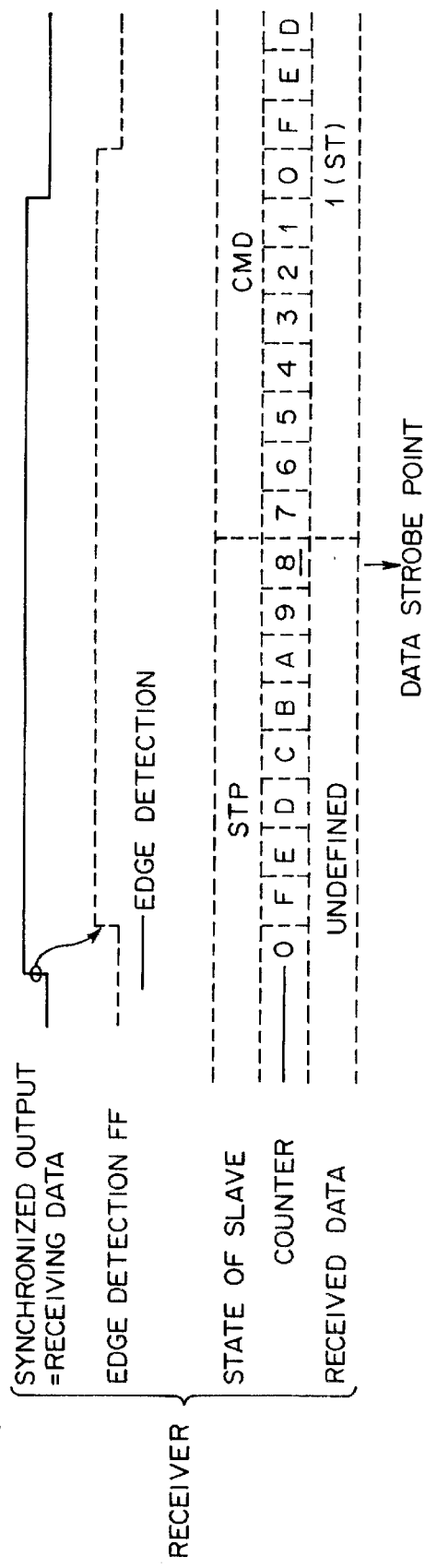
FIG.8(a)
FIG.8(b)

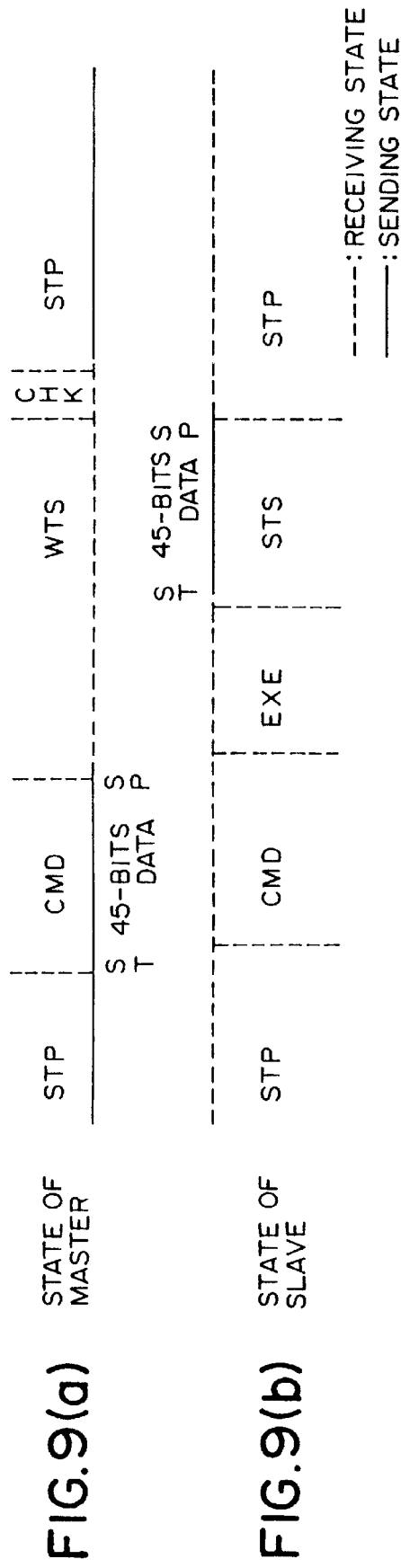

MULTIPROCESSOR SYSTEM CONNECTED BY A DUPLICATED SYSTEM BUS HAVING A BUS STATUS NOTIFICATION LINE

BACKGROUND OF THE INVENTION

1) Field of the Invention

The present invention relates to a multiprocessor system made up of a plurality of processor modules and, more particularly, to a multiprocessor system having improved fault tolerant performance as a result of duplicating the connection bus between processor modules (i.e., as a result of providing a connection bus with redundancy).

2) Description of the Related Art

The performance of a CPU itself is approaching a limit, and, for this reason, so-called multiprocessor systems have been developed which involve a plurality of processors connected together in order to improve system performance.

Such multiprocessor systems are basically categorized into two types depending on the connection configuration of a plurality of CPUs.

One type is a so-called TCMP (Tightly Coupled Multiprocessor) in which a plurality of processors (CPUs) are tightly coupled together. In such a TCMP, the CPUs share a program and data using the same memory. Communication between processors (CPUs) is effected through the memory.

The other type is a so-called LCMP (Loosely Coupled Multiprocessor) in which a plurality of processors are loosely coupled together. In such an LCMP, each of the processors has its own memory. Communication between the processors is effected by transmitting messages through a communication path, for example.

The TCMP is more efficient because there is less overhead during communication between the processors, but the performance of the memory bus tends to become a bottleneck while increasing the number of processors. In the LCMP, overhead is relatively large because all messages must be transmitted for communication between the processors. However, a larger number of processors compared to the TCMP can be used.

To improve system performance of the LCMP configuration, it is commonly necessary to (1) improve the performance of each processor and (2) increase the number of processors coupled together. In an attempt to meet the demand (1), in addition to improved performance of the CPU, TCMP configuration has been employed in the processor, and a large-scale cache and/or memory has been incorporated into the processor. On the other hand, in an attempt to meet demand (2), since an increase in the number of processors coupled together depends on the performance of the system bus coupled to the processors, the number of signal lines of the bus and the speed of the bus clock have been increased.

In order to improve the performance of each processor as previously mentioned, it is necessary to increase the size of the processor hardware significantly, thereby resulting in an increased physical size of the processor. The increase in the physical size of the processor and the number of processors results in a large overall length of the bus, which in turn makes it very difficult to increase the clock speed for the purpose of improving bus performance.

For these reasons, there is a growing demand for a divided system bus in which a bus extension function is added to cause a plurality of physically compact buses to operate as a single system bus. The present invention is applicable to a multiprocessor system having the LCMP configuration and relates to the control of the status of a divided system bus and to recovery from failures in the divided system bus.

FIG. 13 is a block diagram showing an example of the configuration of a common multiprocessor system. The multiprocessor system, shown in FIG. 13, is of the LCMP type, and it is made up of a plurality of processor modules 1 (hereinafter occasionally referred to as PM) connected together through a duplicated system bus 2. Each of the PMs 1 has a configuration as shown in FIG. 15, and the detailed configuration thereof will be described later.

The system bus 2 is made up of two bus lines (a main bus line and a spare bus line), that is, physical buses 2A and 2B. The physical buses 2A and 2B are connected to each of the PMs 1 through bus connecting sections 1A and 1B belonging to each PM.

The physical buses 2A and 2B are respectively connected to bus control mechanisms 3A and 3B which control the states of the physical busses. Bus status notification lines 4A and 4B for notifying the respective states (e.g. a HALT state) of the physical buses 2A and 2B are connected between the bus control mechanisms 3A and 3B and the PMs 1 through the bus connecting sections 1A and 1B of each PM. Each of the bus control mechanisms 3A and 3B has a configuration as shown in FIG. 17, and each of the physical buses 2A and 2B has a configuration as shown in FIG. 18. Their detailed configurations will be described later.

With the configuration as set forth above, the states of the physical buses 2A and 2B are controlled by the bus control mechanisms 3A and 3B. For example, when the physical bus 2A becomes unable to perform normal operations while being used as a main bus, the bus control mechanism 3A halts the physical bus 2A. Further, the bus control mechanism 3A notifies all the PMs 1 of the halted state of the physical bus 2A through the bus status notification line 4A.

Upon receipt of the notification of the halted state of the physical bus 2A, each of the PMs 1 switches from the physical bus 2A being used as the main bus to the physical bus 2B serving as the spare bus by a function of an operating system (hereinafter occasionally referred to as OS). Communication between PMs 1 is then carried out through the physical bus 2B.

FIG. 14 is a block diagram showing an example of an expanded system bus in a multiprocessor system. The multiprocessor system shown in FIG. 14 has the same basic configuration as the multiprocessor system shown in FIG. 13. The reference numerals used in FIG. 13 are used to denote corresponding elements, and the explanation thereof will be omitted here for brevity.

In FIG. 14, adaptors 5A and 5B (hereinafter occasionally referred to as ADPs) are respectively connected to the physical buses 2A and 2B. The ADPs 5A and 5B perform I/O control operations for a hard disk or for a communication line. Each of the ADPs 5A and 5B has a configuration as shown in FIG. 16, and this configuration will be described in detail later.

Bus extender mechanisms 6A and 6B are respectively connected to the physical buses 2A and 2B. Generally, in order to enhance the adaptor function of the multiprocessor system bus, I/O physical buses 8A and 8B, (which are duplicated) respectively having adaptors (ADP) 9A and 9B, are connected to the bus extender mechanisms 6A and 6B through bus extender mechanisms 7A and 7B belonging to the I/O physical buses 8A and 8B.

In other words, as a result of the connection of the system bus 2 with the I/O physical buses 8A and 8B through the bus extender mechanisms 6A, 6B, 7A, and 7B, it becomes possible for each PM 1 to utilize the I/O control function of the adaptors 9A and 9B connected to the I/O physical buses 8A and 8B.

As shown in FIG. 14, the adaptor function for controlling an I/O device is generally expanded by the bus extender mechanisms 6A, 6B, 7A, and 7B. In the configuration shown in FIG. 14, the system bus 2 is expanded for only one system bus (that is, only for the pair of I/O physical buses 8A and 8B). However, the system bus 2 may be expanded to a plurality of pairs of I/O physical buses through the bus extender mechanisms 6A and 6B.

When any failures arise in the expanded system bus, the failures will be overcome in the following manner:

For example, in the event that the physical bus 2A of the system bus 2 becomes unable to perform normal operations while being used as the main bus, the bus control mechanism 3A halts the physical bus 2A and notifies all the PMs 1 of the halted state of the physical bus 2A through the bus status notification line 4A.

Upon detection of the halted state of the physical bus 2A through the bus status notification line 4A, the OS of each PM 1 switches from the physical bus 2A being used as the main bus to the physical bus 2B serving as the spare bus. Thereafter, the OS requests the operator to replace the currently used bus control module (the bus control mechanism 3A) with a new bus control module. After the failures have been overcome as a result of processing performed by the operator, the physical bus 2A is released from the halted state. The OS then checks the recovery of the bus control module, and resumes use of the physical bus 2A.

On the other hand, when the bus extender mechanism 7A of the expanded I/O physical bus 8A detects abnormality, the operation of the bus extender mechanism 7A comes to a halt after informing the bus extender mechanism 6A of this abnormal state. In this state, when the PM 1 accesses the expanded I/O physical bus 8A, the bus extender mechanism 7A sends a response, representing the halt of the I/O physical bus 8A, back to the PM 1.

Based on the response, the OS of the PM1 recognizes the abnormality of the bus extender mechanism 7A belonging to the I/O physical bus 8A, and switches the communication path to the I/O physical bus 8B. Thereafter, the OS encourages the operator to replace the bus extender mechanism 7A that caused the failure. The halted state of the expanded I/O physical bus 8A itself does not affect the states of the physical buses 2A and 2B, and therefore the physical bus 2B and the normal I/O physical bus 8B are usable. The OS of each PM 1 can check the recovery of the expanded I/O physical bus 8A from the failure by periodically polling the I/O physical bus 8A.

FIG. 15 is a block diagram showing an example of the configuration of a general processor module (PM). As shown in FIG. 15, each PM 1 comprises an MPU 1C, a local memory 1D, and bus connecting sections 1A and 1B. These elements 1A to 1D are connected with each other through internal buses AB (address bus), DB (data bus), and CONTROL (control signal lines).

Since the PM 1 is connected to the physical buses 2A and 2B and the bus status notification lines 4A and 4B, the PM 1 is provided with the two bus connecting sections 1A and 1B. As will be described later with reference to FIG. 18, the physical buses 2A and 2B are respectively comprised of an individual signal line 2a for a bus request signal [BRQ (Bus Request) #n] and an individual signal line 2b for a bus grant signal [BGR (Bus Grant) #n], in addition to a tag section (TAG) and a data section (DATA).

FIG. 16 is a block diagram showing an example of the configuration of a general ADP. As shown in FIG. 16, as with the PM 1, the ADPs 5A and 5B are respectively comprised of an MPU 5a, a local memory 5b, a bus connecting section 5c, and a controller 5d for controlling a variety of inputs and outputs. Similarly, these constituent elements 5a to 5d are connected together through the internal buses AB, DB, and CONTROL. The ADPs 5A and 5B are only connected to the physical buses 2A and 2B, respectively. For this reason, each of the ADPs 5A and 5B is provided with only one bus connecting section 5c.

FIG. 17 is a block diagram showing an example of the configuration of a general bus control mechanism. As shown in FIG. 17, the bus control mechanisms 3A and 3B are respectively comprised of an arbiter 3a for controlling the rights to use the physical buses 2A and 2B, a status control section 3b which controls the states of the physical buses 2A and 2B, halts the physical buses 2A and 2B when abnormal states arise in them and informs each of the PMs 1 of the halted state of the physical buses 2A and 2B through the bus status notification lines 4A and 4B, a command execution section 3c which responds to access from the PM1 by executing processing corresponding to a command from the PM 1, and a transceiver section 3d which receives data (a command or the like from each PM 1) from the physical buses 2A and 2B and transmits data to the physical buses 2A and 2B.

FIGS. 17 and 18 show an example of the multiprocessor system comprising PMs 1 in the number of "n", from #1 to #n. The individual signal line 2a is connected between each of the PMs 1 and the arbiter 3a, and the arbiter 3a receives bus request signals BRQ#1 to BRQ#n from the PMs 1. Further, the individual signal line 2b is connected between the arbiter 3a and each of the PMs 1, and bus grant signals BGR#1 to BGR#n are output to the PMs 1.

FIG. 18 is a block diagram for explaining an example of the configuration of a general physical bus. As shown in FIG. 18, the PMs 1 (#1 to #n) are coupled together through the bi-directional physical buses 2A and 2B each composed of the tag section (TAG) and the data section (DATA). The bus control mechanisms 3A and 3B possess the arbitration functions (the function of the arbiter 3a shown in FIG. 17) for the physical buses 2A and 2B, and control the rights to use the physical buses 2A and 2B.

This example adopts a concentrated arbitration method, and the bus request signal BRQ for requesting the right to use the physical bus 2A (or 2B) is transmitted from each PM 1 to the bus control mechanism 3A (or 3B) through the individual signal line 2a. The bus grant signal BGR for conferring the right to use the physical bus 2A (or 2B) is transmitted from the bus control mechanism 3A to the PM 1 through the individual signal line 2b.

FIG. 19 is a timing chart for explaining the operation of a general system bus. FIG. 19 shows operations of the system bus comprising the issue of a command from the module (PM) #1 to the module (PM) #2 and the subsequent return of a reply from the module #2 to the module #1.

The module #1 issues the bus request signal BRQ #1 for data transmission. The arbiter section (see reference numeral 3a shown in FIG. 17) receives that bus request signal BRQ#1 and provides the module #1 with the bus grant signal BGR #1. In the module #1, a flip-flop BGRMF for retaining a grant signal receives the grant signal BGR #1 and starts bus transmission. Bracketed symbols in FIG. 19 represent the type of each flip-flop.

The module #1 has previously set transmission data in a flip-flop DBFO dedicated for outputting data onto the bus, and transmits the transmission data set in the flip-flop DBFO to the data bus during a period in which the flip-flop BGRMF is receiving the bus grant signal BGR #1.

In the example shown in FIG. 19, three words are transmitted. In the tag section TAG shown in FIG. 19, "F" represents First (the first word), "M" represents Middle (a middle word), and "L" represents Last (the last word). Further, in the data section DATA, "C" represents Command (a command), "A" represents Address (an address), and "D" represents Data (data).

The transmission data output onto the bus are received by all the modules connected to the multiprocessor system. Each of the modules checks a designation address included in the command, and fetches only the command addressed to itself. In FIG. 19, the flip-flop DBFI of the module #2 dedicated for inputting data from the bus receives the data transmitted from the module #1, and the received data are fed to the inside of the module #2.

Upon receipt of the command, the module #2 analyzes and executes that command, and then generates a reply comprising response data. That reply data are set in the flip-flop DBFO dedicated for outputting data to the data bus, and the module #2 issues a bus grant signal BGR #2 to the arbiter section. When the arbiter section issues the bus grant signal BGR #2 to the module #2, the module #2 sends the reply data set in the flip-flop DBFO to the data bus during a period in which the flip-flop BGRMF is receiving the grant signal BGR #2.

In the tag section TAG shown in FIG. 19, "S" represents Single (only one word). Further, "R" in the data section DATA represents Reply (a reply). The reply data on the bus are also received by all the modules. However, only the module #1 receives the reply data by the address included in the reply data. When the flip-flop DBFI of the module #1 receives the reply data, one data transmission of the module #1 is completed.

However, in the previously mentioned general multiprocessor system, the PMs 1 are connected to the same physical buses 2A and 2B (the system bus 2), and hence all the PMs 1 always receive the same bus status recognition.

As previously mentioned, in order to increase the speed of the system bus clock of the multiprocessor system, it is necessary to reduce the lengths of the physical buses 2A and 2B. As a result of this, it becomes necessary to divide and combine the physical buses 2A and 2B, that is, it is necessary to extend and connect a plurality of compact multiprocessor systems through the bus extender mechanism.

FIG. 14 shows an example of a conventional expanded system bus. The example shown in FIG. 14 includes an adaptor function which is added for extension through the bus extender mechanisms 6A and 6B. This example is different from such a general multiprocessor system as shown in FIG. 13 in which the system bus 2 is divided, that is, the multiprocessor system itself is connected to another multiprocessor system for extension.

When the system bus 2 is divided (that is, when the system bus 2 is connected to another multiprocessor system through the bus extender mechanism for extension), the system employing such a divided system bus is fundamentally different from the system shown in FIG. 13 in that the PMs are connected to different physical buses, thereby resulting in an inconsistency in the bus status recognition. Such an inconsistency in the recognition not only complicates processing but also makes it impossible to ensure normal operation of the system.

In other words, the operating systems of the PMs recognize the resources differently, and hence it becomes necessary to carry out complicated control (control of resources) by retaining a plurality of control tables. Moreover, the operating systems are resources which have already been constructed, and they are not constructed based on the assumption that inconsistencies will arise in the states of the system buses. Therefore, it is necessary to fundamentally reconstruct the operating system in order to change control (control of resources) associated with the division of the system bus. In this way, the change of the system bus significantly affects the operating system.

SUMMARY OF THE INVENTION

The present invention is conceived in view of the foregoing drawbacks, and an object of the invention is to provide a multiprocessor system which can employ a divided system bus while utilizing existing operating system resources and maintaining high reliability and fault tolerant performance, thereby making it possible to remarkably improve the performance of the system by increasing the speed of the bus clock.

To this end, a multiprocessor system of the present invention includes a plurality of processor modules which are equivalent to each other and are connected together by a duplicated system bus. The multiprocessor system comprises at least one bus extender mechanism by which a plurality of divided segments of the duplicated system bus are coupled together. A bus control mechanism is provided for each of physical buses which form each of the divided segments so as to control the states of the physical buses. Also, a bus status notification line is provided to notify the state of each physical bus controlled by the corresponding one of the bus control mechanisms to processor modules which are connected to the physical bus controlled by the corresponding one of the bus control mechanisms. First notification means is further provided so as to notify the state of each mechanism to other mechanisms among the bus control mechanisms and at least one bus extender mechanism.

In this way, according to the multiprocessor system of the present invention, abnormality arising in one mechanism is notified to all of the other remaining mechanisms by the first notification means. In the event that abnormality in some mechanism is detected and the operation of that mechanism is eventually halted, all the bus control mechanisms and the bus extender mechanism provided on the divided system bus can recognize the status of the bus with consistency. Accordingly, the system bus can be divided while the current operating system resources are utilized, and this makes it possible to increase the speed of the bus clock, thereby significantly improving the performance of the system.

BRIEF DESCRIPTION OF THE DRAWINGS

FIGS. 8(a) and 8(b) are timing charts for illustrating an example of sending and receiving operations (synchronization of data transmission) of the pair of modules of the present embodiment;

FIGS. 9(a) and 9(b) are schematic representations for illustrating operations for transmitting data between the pair of modules of the present embodiment;

DESCRIPTION OF THE PREFERRED EMBODIMENT (a) Aspect of the present invention

Figure 1:
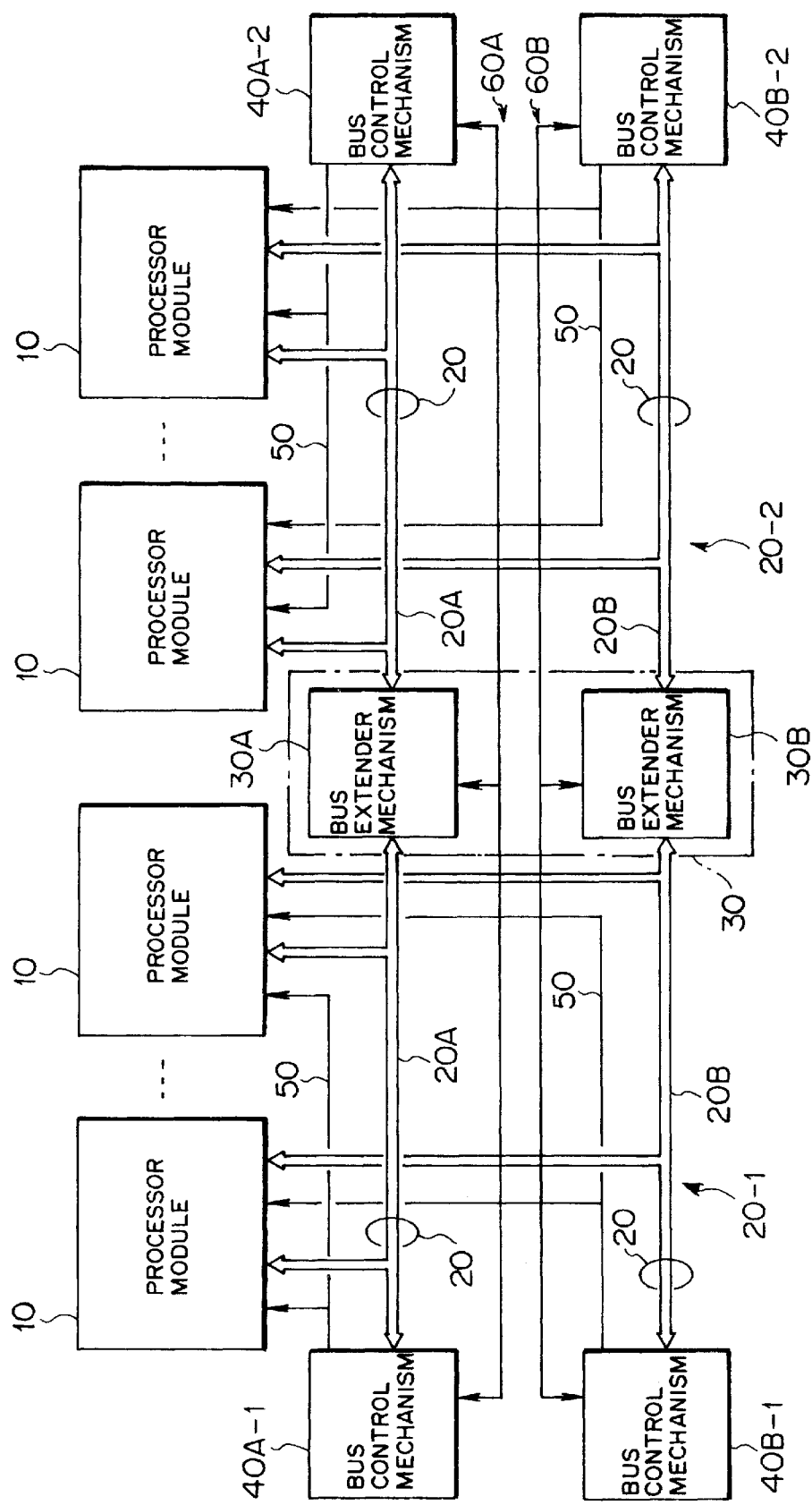
FIG. 1 is a block diagram showing an aspect of the present invention.

FIG. 1 shows an aspect of the present invention. The multiprocessor system of the present invention shown in FIG. 1 is made up of a plurality of processor modules (PM) 10 which are equivalent to each other and are coupled together by a duplicated system bus 20 (comprising two bus lines for main use and spare use, that is, physical buses 20A and 20B).

In this invention, the system bus 20 is divided into a plurality of segments (two segments in FIG. 1), that is, a segment 20-1 and a segment 20-2, and these segments are coupled together by a bus extender mechanism 30. As shown in FIG. 1, this bus extender mechanism 30 is made up of two mechanisms 30A and 30B corresponding to the physical buses 20A and 20B.

The physical buses 20A and 20B of the segments 20-1 and 20-2 of the system bus 20 are respectively provided with pairs of bus control mechanisms 40A-1 and 40B-1 and 40A-2 and 40B-2 for controlling the states of the physical buses 20A and 20B. A bus status notification line 50 is provided between each of the bus control mechanisms 40A-1, 40B-1, 40A-2, and 40B-2 and PMs 10 connected to a physical bus 20A or 20B which is controlled by that bus control mechanism 40A-1, 40B-1, 40A-2, or 40B-2. The states of the physical buses 20A and 20B are notified to the PMs 10 from the bus control mechanisms 40A-1, 40B-1, 40A-2, and 40B-2 through the bus status notification lines 50.

Further, first notification means 60A is provided between the bus control mechanisms 40A-1 and 40A-2 and the bus extender mechanism 30A for mutually notifying the status of these mechanisms 40A-1, 40A-2, and 30A. First notification means 60B is provided between the bus control mechanisms 40B-1, 40B-2, and the bus extender mechanism 30B for notifying these mechanisms 40B-1, 40B-2, and 30B of their states.

The first notification means 60A is made up of an inter-mechanism notification line for connecting the bus control mechanisms 40A-1, 40A-2 and the bus extender mechanism 30A in series, and logical OR circuits respectively provided in the mechanisms 40A-1, 40A-2, and 30A. The inter-mechanism notification line transmits the state of one of the mechanisms 40A-1, 40A-2 and 30A to an adjacent mechanism. The logical OR circuit calculates a logical sum from the state of each of the mechanisms 40A-1, 40A-2, and 30A and the state transmitted from a mechanism in the preceding stage through the inter-mechanism notification line. The thus calculated logical sum is sent to a mechanism in the succeeding stage through the inter-mechanism notification line. Further, completely in the same manner as the first notification means 60A, the first notification means 60B is also constructed using an inter-mechanism notification line for connecting the bus control mechanisms 40B-1, 40B-2, and the bus extender mechanism 30B in series, and logical OR circuits respectively provided in the mechanisms 40B-1, 40B-2, and 30B.

At this time, the logical sum calculated by the logical OR circuit may be sent to the mechanism in the succeeding stage through the inter-mechanism notification line irrespective of operating clocks of the mechanisms. Further, the inter-mechanism notification line may be made up of a forward notification line through which the state of one mechanism is transmitted to the other mechanisms in a predetermined order and a backward notification line through which the state of one mechanism is transmitted to the other mechanisms in a reversed order.

Each of the mechanisms 40A-1, 40B-1, 40A-2, 40B-2, 30A, and 30B may be provided with a logical value fixing section. The logical value fixing section fixes an input signal received from the inter-mechanism notification line at a logical value representing that the mechanism in the preceding stage is in an abnormal or halted state when the mechanism in the preceding stage is not connected to the inter-mechanism notification line.

Furthermore, the mechanisms 40A-1, 40B-1, 40A-2, 40B-2, 30A, and 30B connected in series with each other have structures such that the mechanism at the last stage among them always fixes an input signal from the inter-mechanism notification line at a logical value representing that the mechanism in the preceding stage is in a normal state.

Moreover, each of the mechanisms 40A-1, 40B-1, 40A-2, 40B-2, 30A, and 30B may be provided with a synchronization circuit for synchronizing an input signal received from the inter-mechanism notification line with an operating clock of each mechanism, and a status control section for temporarily halting the operation of the mechanism including this status control section when the input signal synchronized by the synchronization circuit becomes a logical value representing an abnormal or halted state. In this case, the status control section may be arranged so as to resume the operation of the halted mechanism when the input signal synchronized by the synchronization circuit becomes a logical value representing a normal state after the temporal halt of the operation of that mechanism.

The above configurations designed to eliminate an inconsistency in recognizing the bus status may make it difficult to carry out the identification, and monitor of recovery of a faulty module which are conventionally available. To overcome this problem, the multiprocessor system of the present invention is further provided with means for effecting the identification, and check of the recovery of a faulty bus control module.

Each of the mechanisms 40A-1, 40B-1, 40A-2, 40B-2, 30A, and 30B may be provided with second notification means for notifying the state of each mechanism to another mechanism which serves as a counterpart in each pair (40A-1 and 40B-1, 40A-2 and 40B-2, and 30A and 30B) which is produced as a result of the duplication of the system bus 20, and an access section for accessing an internal register of the counterpart mechanisms in response to a command from each of the PMs 10.

In this case, the internal register of each mechanism is provided with a bit for retaining the state received from the second notification means of the counterpart mechanism.

Each of the mechanisms 40A-1, 40B-1, 40A-2, 40B-2, 30A, and 30B may be provided with logical value fixing section for fixing an input signal from the second notification section at a logical value representing that the counterpart mechanisms is in an abnormal or halted state when the counterpart mechanism does not exist.

The access section of the pair of mechanisms may be connected together by two serial interface lines such that each of the serial interface lines is fixedly connected between a master side of the access section of one mechanism and a slave side of the access section of the other mechanism.

Further, when abnormality or halt of the main bus of the duplicated system bus 20 is detected, the operating system provided in each PM 10 sends a command for reading information of the internal register of the counterpart mechanism to each of the bus control mechanisms and the bus extender mechanism on the spare bus via the spare bus of the duplicated system bus 20. Upon receipt of that command, the access section of each mechanism accesses the internal register of the counterpart mechanism in order to read information held in the internal register. The thus read information is transferred to the operating system through the spare bus. The operating system identifies the mechanism in the main bus that caused the abnormality or halt of the operation based on the information of the internal register received from each of the mechanisms.

At this time, the operating system sends, via the spare bus, a command for initializing or separating the identified mechanism to the mechanism on the spare bus which is the counterpart of the identified mechanism and which caused the abnormality or halt of the operation. The access section of the mechanism that received the command initializes or separates the identified mechanism.

The operating system monitors the state of the system bus that includes the mechanism identified as caused the abnormality or halt of the operation. Upon confirmation of the release of that system bus from its halted state, the operating system judges that the identified mechanism has recovered from the failure.

In the multiprocessor system of the present invention described with reference to FIG. 1, the state of each mechanism is notified to the other mechanisms among the mechanisms 40A-1, 40B-1, 40A-2, 40B-2, 30A, and 30B by the first notification means 60A or 60B. All of the PMs 10 in the segments 20-1 and 20-2 can recognize the status of the physical buses 20A and 20B with consistency. In other words, the physical buses 20A and 20B divided into a plurality of segments can be controlled as a single bus. When a failure is detected in any one of the mechanisms on each of the physical buses 20A and 20B and when the operation of that mechanism is halted, the halted state of that mechanism is notified to all the other mechanisms, as a result of which all the physical buses can be stopped.

Each of the first notification means 60A and 60B may be formed by a inter-mechanism notification line and a logical OR circuit, and a logical sum is calculated from the state of each of the mechanisms 40A-1, 40A-2, 30A, 40B-1, 40B-2, and 30B and the state of the mechanism in the preceding stage. The thus obtained logical sum is notified to the mechanism in the succeeding stage. As a result of this, it is possible to sequentially transmit the state of each mechanism (for example, the states of the physical buses 20A and 20B) to all the other mechanisms.

At this time, the logical sum calculated by the logical OR circuit is sent to the mechanisms in the succeeding stage irrespective of the operating clocks of the mechanisms as required. Further, status information is bidirectionally transmitted over the forward and backward notification lines. As a result of this, it becomes possible to transmit the status information between the mechanisms at high speed.

Since each of the mechanisms 40A-1, 40B-1, 40A-2, 40B2, 30A, and 30B is provided with the logical value fixing section, it is possible for each mechanism to judge that the state of the mechanism in the preceding stage is in an abnormal or halted state when no mechanism exists in the preceding stage.

The logical value representing as the mechanism in the preceding stage being in a normal state is input to the mechanism located at the last stage of the line of mechanisms (the first stage). As a result, it is possible for that mechanism on the last stage to constantly judge that the state of a mechanism in the preceding stage which does not exist actually is normal, and hence it is possible to prevent the transmission of an erroneous state (an abnormal or halted state) to the mechanisms in the succeeding stages.

Furthermore, the signal transmitted from the mechanism in the preceding stage is synchronized by the synchronization circuit. Therefore, even when the mechanism is different in operating clock from the mechanism in the preceding stage, the signal received from the mechanism in the preceding stage can be used for the processing in the status control section. Moreover, when the synchronized input signal has become a logical value representing an abnormality or a halted state, the status control section judges that any of the mechanisms other than the mechanism including this status control section has become abnormal or halted state, whereby the operation of that mechanism is temporarily halted. When the synchronized input signal has become a logical value representing normality in the mechanism which is in a temporarily halted state, the status control section resumes the operation of the halted mechanism, and this mechanism can automatically return to its normal state.

On the other hand, within each pair of the mechanisms obtained as a result of the duplication of the system bus 20, the state of one mechanism is notified to the counterpart mechanism by the second notification means. Moreover, the access section accesses the internal register of the counterpart mechanism in response to a command from each of the PMs 10. Accordingly, when one of the physical buses 20A and 20B of the duplicated system bus 20 is halted, it is possible to know the state of each of the mechanisms on the halted physical bus through the remaining physical bus 20A or 20B and the mechanisms on that physical bus. Therefore, it is easy for each of the PMs 10 to identify a mechanism that caused the halt of the operation of the physical bus (i.e., a mechanism which is a cause of abnormality).

In this case, the bit of the internal register of one mechanism retains the state which has been received from the counterpart mechanism through the second notification means, and therefore it is possible to grasp the states of the counterpart mechanism without accessing the counterpart mechanism.

Further, each of the mechanisms 40A-1, 40B-1, 40A-2, 40B-2, 30A, and 30B is provided with logical value fixing section. As a result of this, each mechanism can judge that the counterpart mechanism is in an abnormal or halted state when the counterpart mechanism does not exist.

The access section of the pair of mechanisms are fixedly connected to each other through two serial interface lines, and therefore mutual access between each pair of mechanisms can be performed without the need of arbitration operation.

When the operating system of the PM 10 detects an abnormal or halted state of the main bus of the duplicated system bus 20, contents of the internal register of the counterpart mechanism on the main bus are successively read out through the spare bus and the mechanisms on the spare bus. Accordingly, even when the main bus is in a halted state, it is possible to easily identify the mechanism on the main bus that caused the abnormality or halt. At this time, it is possible to initialize or separate the identified mechanism in response to an instruction from the operating system.

The operating system monitors the state of the system bus that includes the mechanism identified as caused the abnormality or halt, which enables the check and determination of the recovery of the identified mechanism responding to the release of the system bus from its halted state.

As previously mentioned in detail, in the multiprocessor system of the present invention, abnormality arising in any one of the mechanisms is notified to all of the other mechanisms by the first notification means. Even when a part of the mechanisms has detected that abnormality and halted its operation, all of the bus control mechanisms and bus extender mechanism on the divided system bus can recognize the status of the bus as being the same. Accordingly, the system bus can be divided utilizing the current operating system resources, thereby resulting in a faster bus clock. This faster bus clock contributes to a significant increase in performance.

A logical sum calculated based on the state of each of the mechanisms and the state of a mechanism in the preceding stage is transmitted to the mechanisms in the succeeding stages through the inter-mechanism notification line, which makes it possible to reliably transmit the state of each mechanism to all the other mechanisms. At this time, the logical sum is sent to the mechanism in the succeeding stage irrespective of the operating clocks of the mechanisms. The status information is bidirectionally sent over the forward and backward notification lines, which makes it possible to reliably send the status information between the mechanisms at high speed.

Each of the mechanisms is provided with a logical value fixing section. When a mechanism is not present in the preceding stage as a result of the removal of a circuit board serving as that mechanism, from a back panel, each mechanism judges the mechanism in the preceding stage as being in an abnormal or halted state. In this way, it becomes possible for the mechanism to perform operation corresponding to the judged state.

Further, a logical value representing the mechanism in the preceding stage as being in a normal state is input to the mechanism located at the last stage (in the first stage) of the line of the mechanisms, and the mechanism that is not actually present in the preceding stage is constantly judged as being normal. Therefore, it is possible to reliably prevent the abnormal state (or the halted state) resulting from the absence of the mechanism in the preceding stage from being erroneously transmitted from the mechanism in the first stage to the mechanism in the succeeding stage, thereby ensuring the reliable transmission of the correct state of each mechanism.

Furthermore, when the input signal synchronized by the synchronization circuit is a logical value which represents an abnormal or halted state, the status control section temporarily halts the operation of the mechanism including this status control section. When the synchronized input signal returns to a logical value which represents a normal state, the status control section resumes the operation of the halted mechanism. In this way, the operation of each mechanism can be automatically halted or resumed depending on the occurrence of abnormality (halt of operation) or the elimination of the abnormality.

On the other hand, according to the present invention, even when one of the physical buses (for example, the main bus) of the duplicated system bus is halted, it is possible to know the state of each of the mechanisms on the halted physical bus through the other physical bus (the spare bus) and the mechanisms on this standby physical bus, which enables the identification of the mechanism that caused the halt of the physical bus. As a result of this, it becomes possible to initialize or separate the identified mechanism or possible to check and determine the recovery of the identified mechanism responding to the release of the system bus from its halted state.

Specifically, in the event that one of the physical buses is entirely halted as a result of a failure arising in a part of the mechanisms, it becomes possible to identify the faulty mechanism and perform control by making access to the other physical bus. In this way, it is possible to implement the divided system bus while the current operating system resources are utilized and high reliability and fault tolerant performance are maintained, and it is also possible to realize considerably improved performance by virtue of a resultantly increased bus clock speed.

In this case, a bit of the internal register of each mechanism retains the state notified from the counterpart mechanism. As a result of this, it is possible to reliably and easily grasp the state of the counterpart mechanism without making access thereto.

Moreover, each of the mechanisms is provided with the logical value fixing section. Hence, for example, when the counterpart mechanism is not present as a result of the removal of a circuit board which forms the counterpart mechanism from a back panel, each of the mechanisms judges that the counterpart mechanism is in an abnormal or halted state, and hence it becomes possible for the mechanism to execute operation corresponding to the judged state.

The access section of each pair of mechanisms are fixedly connected together through the two serial interface lines, and therefore it becomes possible for the pair of mechanisms to access each other without the need of arbitration operation, thereby contributing to a simplified configuration of the system.

(b) Embodiment of the present invention

A multiprocessor system according to an embodiment of the present invention will be described with reference to the accompanying drawings.

Figure 2:
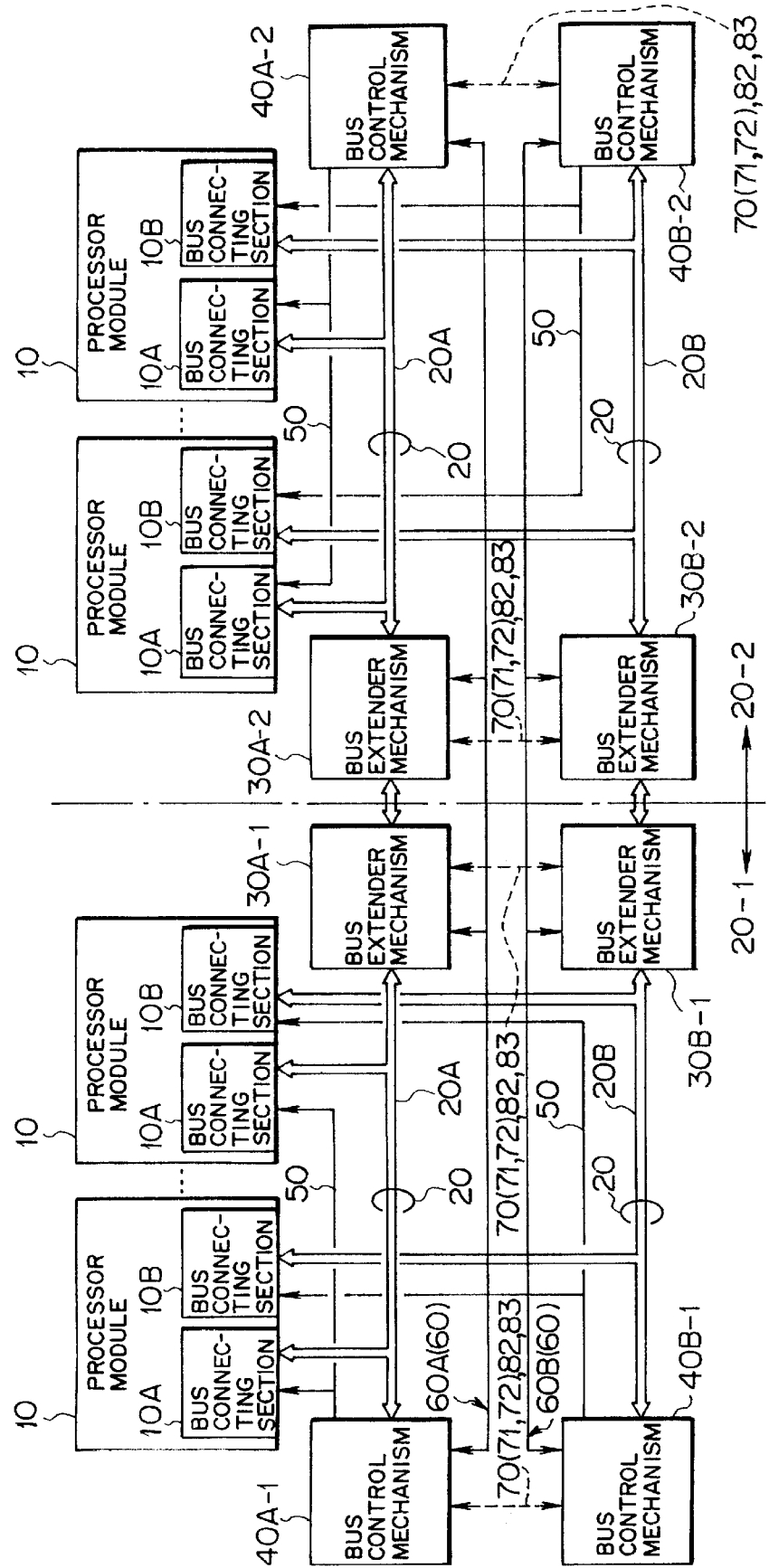
FIG. 2 is a block diagram showing the basic configuration of a multiprocessor system according to an embodiment of the present invention.

FIG. 2 is a block diagram showing the basic configuration of a multiprocessor system according to one embodiment of the present invention. The multiprocessor system of the present embodiment shown in FIG. 2 is substantially the same in configuration as the multiprocessor system shown in FIG. 1. The multiprocessor system is made up of a plurality of processor modules (PM) 10 which are equivalent to each other and are connected together by a duplicated system bus 20 comprising physical buses 20A and 20B (for use as a main bus and a spare bus). Each PM 10 is connected to the physical bus 20A through its bus connecting section 10A and also connected to the physical bus 20B through its another bus connecting section 10B.

The system bus 20 of the present embodiment is also divided into two segments 20-1 and 20-2. The physical buses 20A of the segments 20-1 and 20-2 are coupled together by a bus extender mechanism 30A-1 of the segment 20-1 and a bus extender mechanism 30A-2 of the segment 20-2. Similarly, the physical buses 20B of the segments 20-1 and 20-2 are coupled together by a bus extender mechanism 30B-1 of the segment 20-1 and a bus extender mechanism 30B-2 of the segment 20-2.

The physical buses 20A and 20B of the segment 20-1 of the system bus 20 are respectively provided with bus control mechanisms 40A-1 and 40B-1 for controlling the states of the physical buses 20A and 20B. Similarly, the physical buses 20A and 20B of the segment 20-2 of the system bus 20 are respectively provided with bus control mechanisms 40A-2 and 40B-2 for controlling the states of the physical buses 20A and 20B. A bus status notification line 50 is connected between each of the bus control mechanisms 40A-1, 40B-1, 40A-2, and 40B-2 and PMs 10 connected to the physical bus 20A or 20B which is controlled by the bus control mechanism 40A-1, 40B-1, 40A-2, or 40B-2 so as to notify the status of the physical bus 20A or 20B.

Throughout descriptions of the embodiment which will be given hereunder, the previously mentioned bus control mechanisms 40A-1, 40B-1, 40A-2, and 40B-2 and the bus extender mechanisms 30A-1, 30B-1, 30A-2, and 30B-2 are generically referred to as a bus control module occasionally. Further, pairs of mechanisms resulting from the duplication of the system bus 20; namely, a pair of bus control mechanisms 40A-1 and 40B-1, a pair of bus control mechanisms 40A-2 and 40B-2, a pair of bus extender mechanisms 30A-1 and 30B-1, and a pair of bus extender mechanisms 30A-2 and 30B-2 are occasionally referred to as pair modules.

In the present embodiment, first notification means 60A (an inter-bus control module status notification line 60 (or an inter-mechanism notification line)) is provided between the bus control modules 40A-1, 30A-1, 30A-2, and 40A-2 on the physical bus 20A for notifying the state of one module of them to the other modules.

Similarly, first notification means 60B (the inter-bus control module status notification line (or an intermechanism notification line) 60) is provided between the bus control modules 40B-1, 30B-1, 30B-2, and 40B-2 on the physical bus 20B for notifying the state of one module of them to the other modules.

These first notification means 60A and 60B are means for allowing the PMs 10 to treat the system bus 20 consisting of two segments as a single bus. The detailed configurations of the first notification means 60A and 60B will be described later with reference to FIG. 3.

In the present embodiment, in order to notify the state of one bus control module to the counterpart bus control module in each pair, second notification means 70 (interpaired-module status notification lines 71 and 72) and inter-paired-module interface lines 82 and 83 are respectively provided between the pair modules 40A-1 and 40B-1, 40A-2 and 40B-2, 30A-1 and 30B-1, and 30A-2 and 30B-2. The second notification means 70 and the inter-paired-module interface lines 82 and 83 will be described with reference to FIGS. 4 to 6.

In the multiprocessor system of the present embodiment shown in FIG. 2, the state of one bus control module is notified to the other bus control modules within bus control modules 40A-1, 30A-1, 30A-2, and 40A-2 by the first notification means 60A or within the bus control modules 40B-1, 30B-1, 30B-2, and 40B-2 by the first notification means 60B. As a result of this, all the PMs 10 in the segments 20-1 and 20-2 recognize the same bus status regarding the physical buses 20A and 20B.

In other words, it is possible to control the physical buses 20A and 20B, which are divided into the segments 20-1 and 20-2, as when they are in one bus status. In the event that any one of the bus control modules on the physical bus 20A or 20B detects a failure and the operation of that bus control module is halted, the halted state of the bus control module is notified to all the other control modules, which makes it possible to halt the overall physical bus 20A or 20B.

In the case of such a failure, even when one of the physical bus 20A or 20B of the duplicated system bus 20 is halted, it is possible to know the state of each of the bus control modules on the halted physical bus through the remaining physical bus 20A or 20B and the bus control modules on that bus by use of the functions of the second notification means 70 and the inter-paired-module interface lines 82 and 83.

Therefore, it becomes easy for each PM 10 to identify a bus control module (a faulty bus control module) that caused the operation halt (a bus control module which is a cause of abnormality). As will be described in detail with reference to FIG. 11, it is possible to check the details of the failure of the faulty bus control module or to reinitialize or separate that faulty bus control module.

Figure 3:
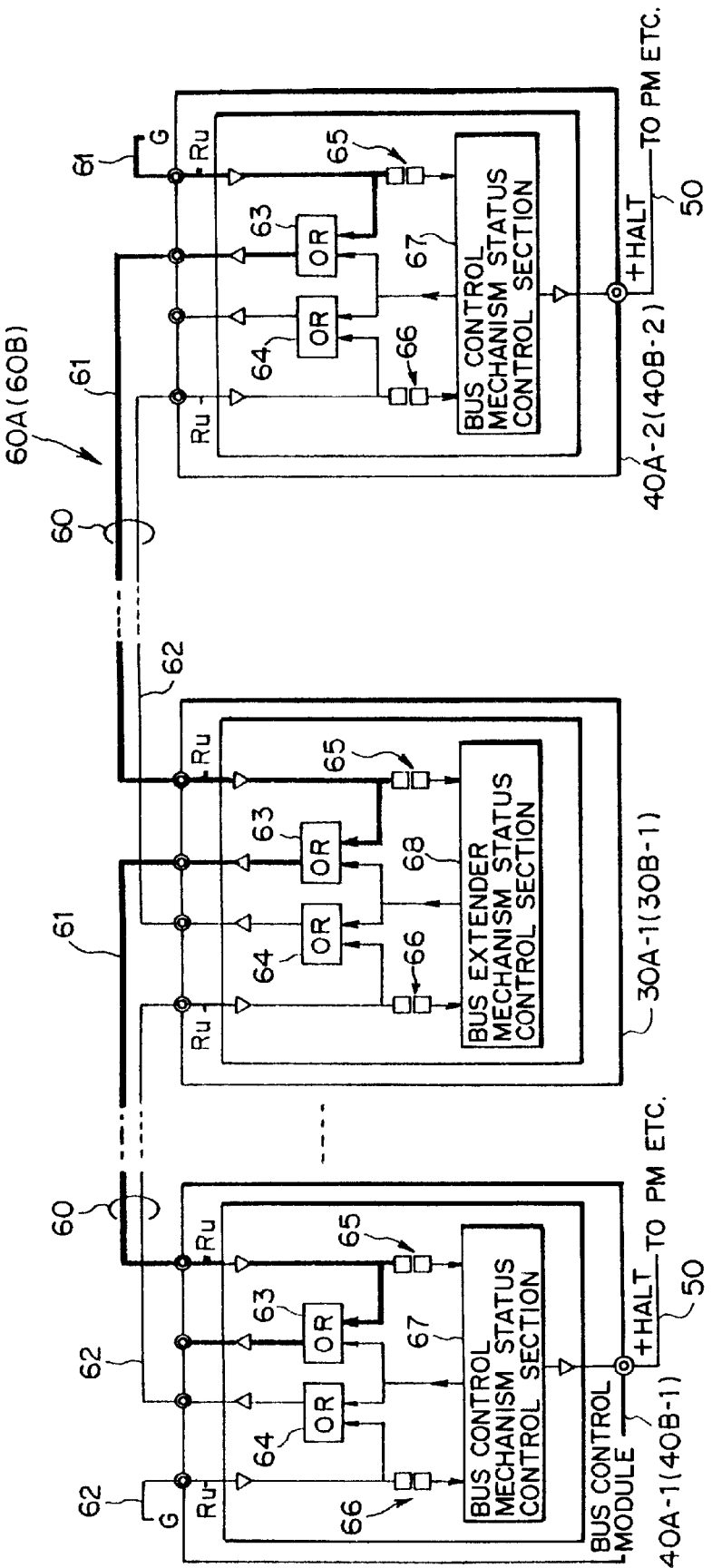
FIG. 3 is a block diagram showing the configuration of first notification means of the present embodiment.

FIG. 3 is a block diagram showing the configuration of the first notification means of the present embodiment. As shown in FIG. 3, the first notification means 60A of the present embodiment is made up of the inter-bus control module status notification line (the inter-mechanism notification line) 60 for connecting the bus control modules 40A-1, 30A-1, 30A-2, and 40A-2 in series, and logical OR circuits (OR gates) 63 and 64 provided in each of the bus control modules 40A-1, 30A-1, 30A-2, and 40A-2. Although the bus extender mechanism 30A-2 (30B-2) is not illustrated in FIG. 3, this bus extender mechanism 30A-2 (30B-2) is completely the same in configuration as the bus extender mechanism 30A-1 (30B-1) shown in FIG. 3.

The inter-bus control module status notification line 60 transmits the state of one of the bus control modules 40A-1, 30A-1, 30A-2, and 40A-2 to the adjacent bus control module. The inter-bus control module status notification line 60 is made up of a forward notification line 61 for transmitting the state of each bus control module in a predetermined sequence (from the right to left in FIG. 3), and a backward notification line 62 for transmitting the state of each bus control module in a reversed sequence (from the left to the right in FIG. 3).

The logical OR circuit 63 of the two logical OR circuits 63 and 64 provided in each bus control module calculates a logical sum from the state of each bus control module (a state received from a status control section 67 or 68 which will be described later) and a state received from the preceding stage (the module on the right side) received through the forward notification line 61. The thus calculated logical sum is then fed to the succeeding stage (the module on the left side) over the output-side forward notification line 61.

Similarly, the logical OR circuit 64 calculates a logical sum from the state of each bus control module (the state received from the status control section 67 or 68 which will be described later) and a state received from the preceding stage (the module on the left side) through the backward notification line 62. The thus calculated logical sum is fed to the succeeding stage (the module on the right side) over the output-side backward notification line 62.

At this time, the logical sums thus calculated by the logical OR circuits 63 and 64 are delivered to the succeeding stage over the inter-bus control module status notification line 60 (61 and 62) irrespective of an operating clock of each bus control module.

In each of the bus control modules 40A-1, 30A-1, 30A-2, and 40A-2, the input-side forward notification line 61 and the input-side backward notification line 62 are respectively provided with a pull-up resistor Ru (logical value fixing section). As a result of this, when the bus control module in the preceding stage is neither connected to the input-side forward notification line 61 nor the input-side backward notification line 62, input signals received over the input-side forward notification line 61 and the input-side backward notification line 62 are pulled up by the pull-up resistors Ru, so that the input signals are fixed to a logical value representing the bus control module in the preceding stage as being in an abnormal or halted state.

Normally, the bus control modules 40A-1 and 40A-2 located at both ends of the bus control modules 40A-1, 30A1, 30A-2, and 40A-2 which are connected in series through the inter-bus control module status notification line 60 are not connected to the input-side forward notification line 61 and the input-side backward notification line 62. For this reason, in the present embodiment, the input-side forward notification line 61 and the input-side backward notification line 62 are grounded (connected to the ground (G)). As a result of this, input signals received over the input-side forward notification line 61 and the input-side backward notification line 62 are pulled down to the ground potential. In this way, the input signals received from the input-side forward notification line 61 and the input-side backward notification line 62 are fixed to a logical value representing the bus control module in the preceding stage as being in a normal state.

In the previously mentioned embodiment, the logical value for an abnormal or halted state is obtained in a pulled-up state, whereas the logical value for a normal state is obtained in a pulled-down state. Conversely, the logical value for an abnormal or halted state may be obtained in a pulled-down state, whilst the logical value for a normal state may be obtained in a pulled-up state.

In the present embodiment, each of the bus control modules 40A-1, 30A-1, 30A-2, and 40A-2 is provided with a pair of synchronization circuits 65 and 66, and a bus control mechanism status control section 67 or bus extender mechanism status control section 68.

The synchronization circuits 65 and 66 synchronize the input signals received over the input-side forward notification line 61 and the input-side backward notification line 62 with the operating clock of each of the bus control modules. The thus synchronized input signals are output to the status control section 67 or 68. Each of the synchronization circuits 65 and 66 is made up of a twostage flip-flop.

When at least one of the input signals synchronized by the synchronization circuits 65 and 66 has a logical value representing an abnormal or halted state, each of the state control sections 67 or 68 temporarily halts the operation of the bus control module including the status control section 67 or 68.

Further, when both of the input signals synchronized by the synchronization circuits 65 and 66 have a logical value representing a normal state after the operation of the bus control module was temporarily halted, the status control sections 67 or 68 resumes the operation of the halted bus control module.

Figure 17:
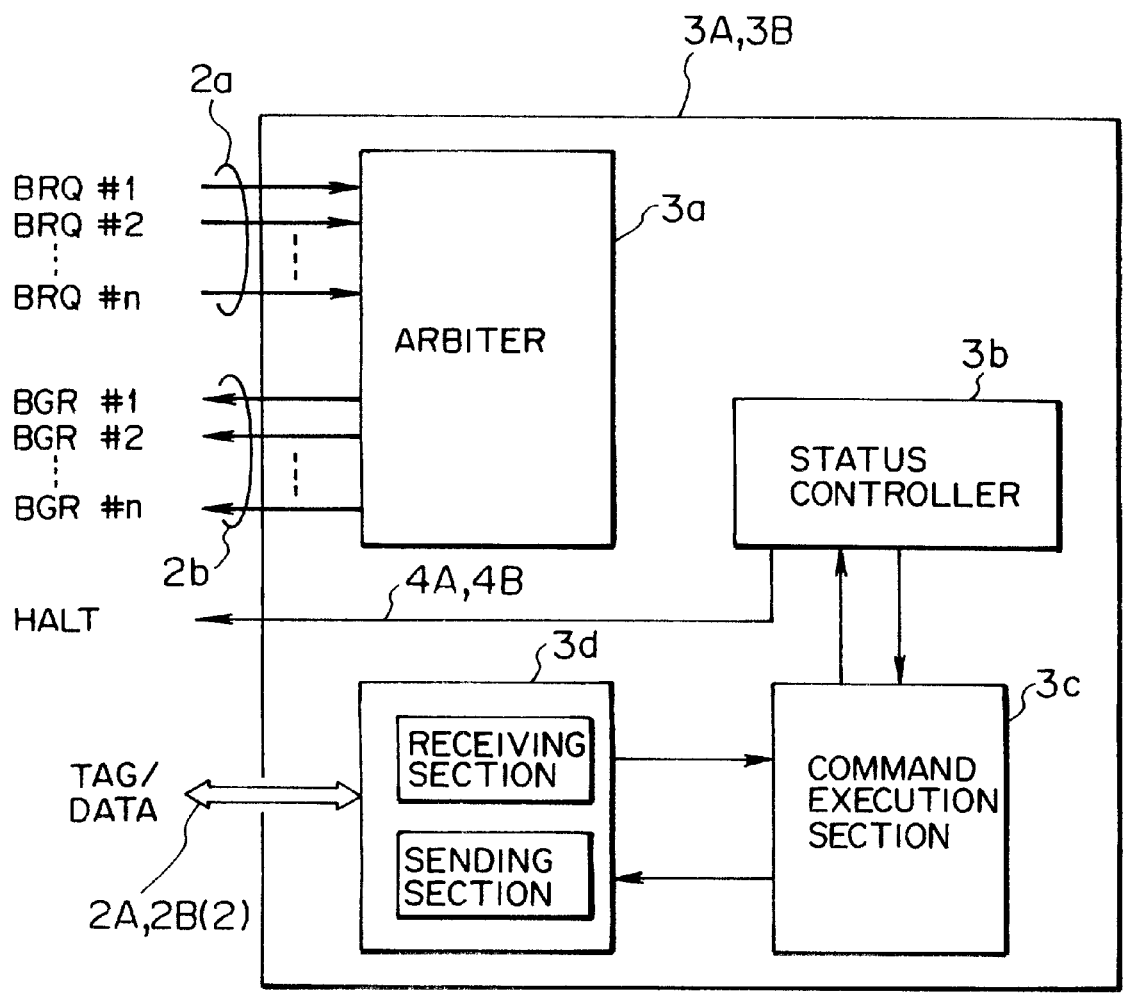
FIG. 17 is a block diagram showing an example of the configuration of a general bus control mechanism.
Figure 18:
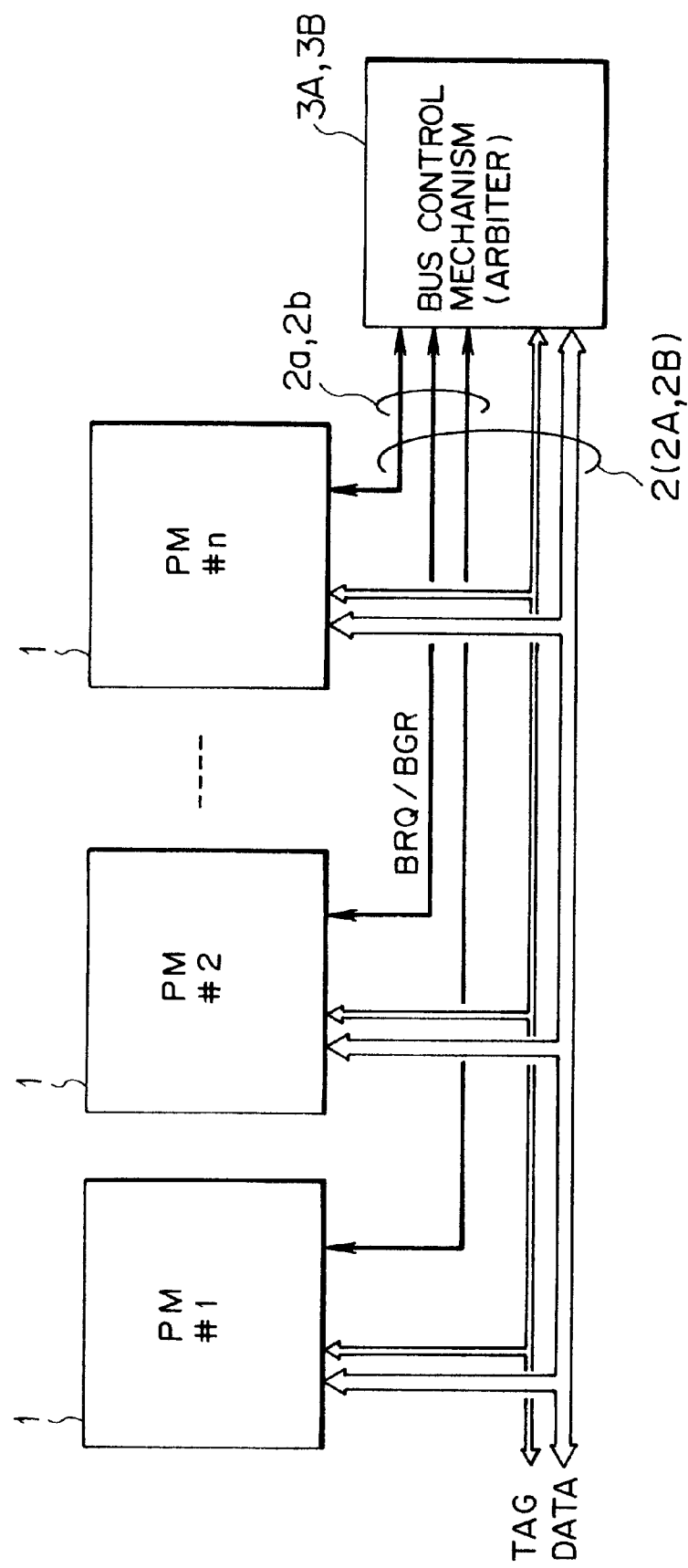
FIG. 18 is a block diagram for illustrating an example of the configuration of a general physical bus.
Figure 19:
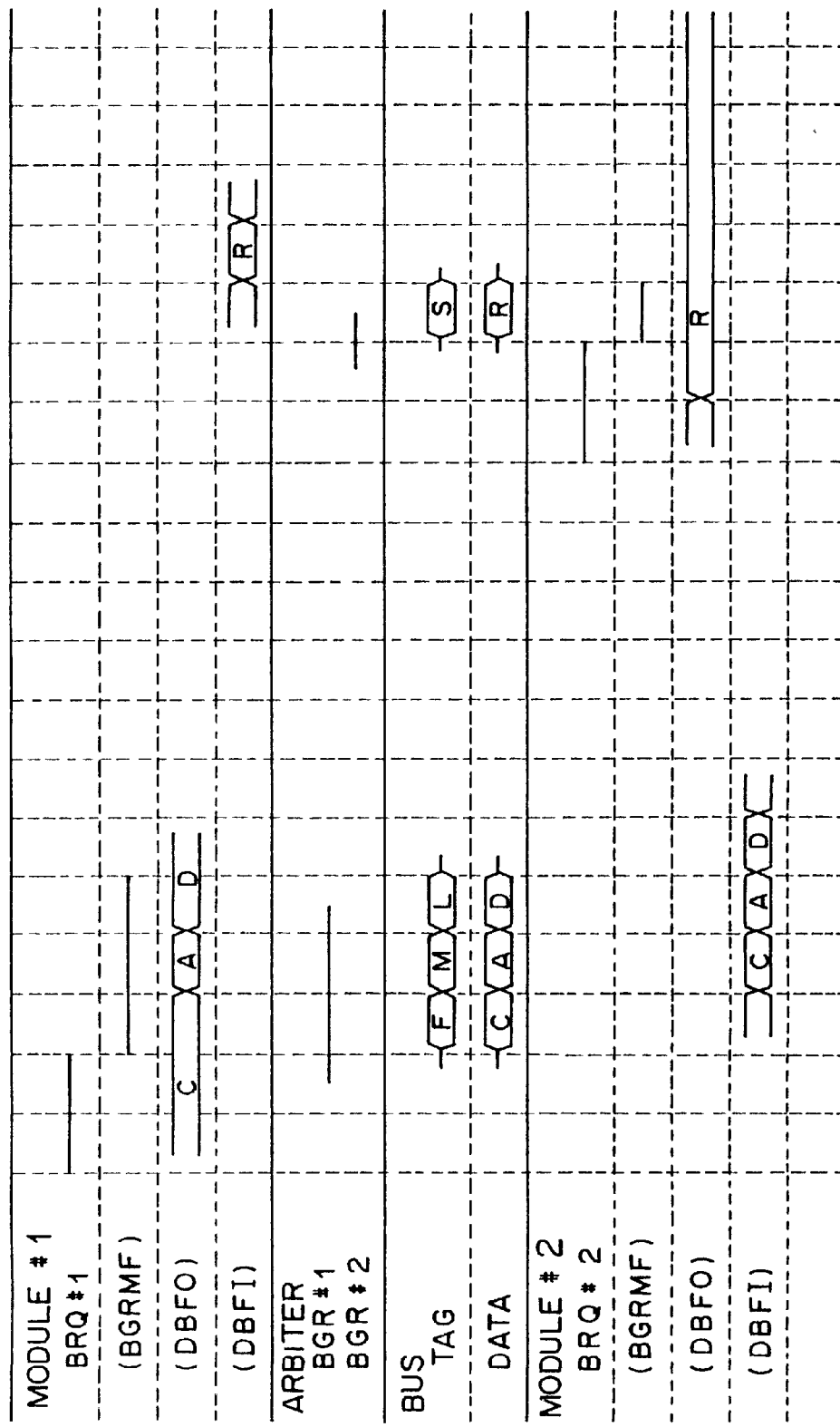
FIG. 19 is a timing chart for illustrating the operation of a general system bus.

As will be described later with reference to FIG. 4, the bus control mechanism status control section 67 has the same function as the status control, section 3b previously described with reference to FIG. 17. Specifically, the bus control mechanism status control section 67 monitors the state of the physical bus 20A, and stops the physical bus 20A when abnormality arises in the physical bus 20A. This halted state (HALT state) of the physical bus 20A is then notified to each of the PMs 10 through the bus status notification line 50.

The above explanation has been given of the configuration of the first notification means 60A provided along the bus control modules 40A-1, 30A-1, 30A-2, and 40A-2 on the physical bus 20A. The first notification means 60B provided along the bus control modules 40B-1, 30B-1, 30B-2, and 40B-2 are completely the same in configuration as the previously mentioned first notification means 60A.

Operation of the first notification means 60A which is provided between bus control modules and has a configuration as shown in FIG. 3 will now be described. The notification of the state of a bus control module will now be described on the basis of an example of a path (the forward notification line 61) designated by a thick line shown in FIG. 3.

When the bus control module (bus control mechanism) 40A-2 at the right end detects abnormality thereof, the bus control mechanism status control section 67 within the bus control module halts the physical bus 20A which is obtained under control of the bus control mechanism status control section 67. Further, the bus control mechanism status control section 67 causes the output-side forward notification line 61 to have a high logic level through the logical OR circuit (OR gate) 63 on the right side in FIG. 3. This signal is transmitted to the adjacent bus control modules 30A-2 and 30A-1 one by one.

For example, the signal which the bus control module (bus extender mechanism) 30A-1 received over the input-side forward notification line 61 is synchronized by the synchronization circuit 65, and the thus synchronized signal is then transmitted to the status control section 68 of the bus control module 30A-1. Simultaneously, the input signal received over the input-side forward notification line 61 causes the following forward notification line 61 to have a high logic level by way of the logical OR circuit 63 of the bus control module 30A-1 irrespective of the operating clock of the bus control module 30A-1. This signal is further transmitted to the adjacent bus control module 40A-1 (the bus control mechanism at the left end in FIG. 3). In this way, the occurrence of the abnormality in the physical bus 20A is finally transmitted to all of the bus control modules.

As previously mentioned, "G" shown in FIG. 3 represents a grounded connection (the earth), and the grounded notification line is prevented from turning into a high logic level. Further, "Ru" represents a pull-up resistor for inevitably providing the notification line with a high logic level when the bus control module is not mounted, for example. The signal transmitted from the adjacent bus control module is usually out of synchronization with the clock of the bus control module received this signal. For this reason, the signal is synchronized by the synchronization circuit 65 or 66.

The previously explained path is a channel through which the signal flows from the right to the left in FIG. 3. However, the microprocessor system is further provided with a channel in a reversed direction (the backward notification line 62). This backward notification line 62 operates in the same manner as the previously mentioned forward notification line 61, and therefore the state of each of the bus control modules 40A-1, 30A-1, 30A-2, and 40A-2 can be transmitted to all of the other bus control modules.

Figure 4:
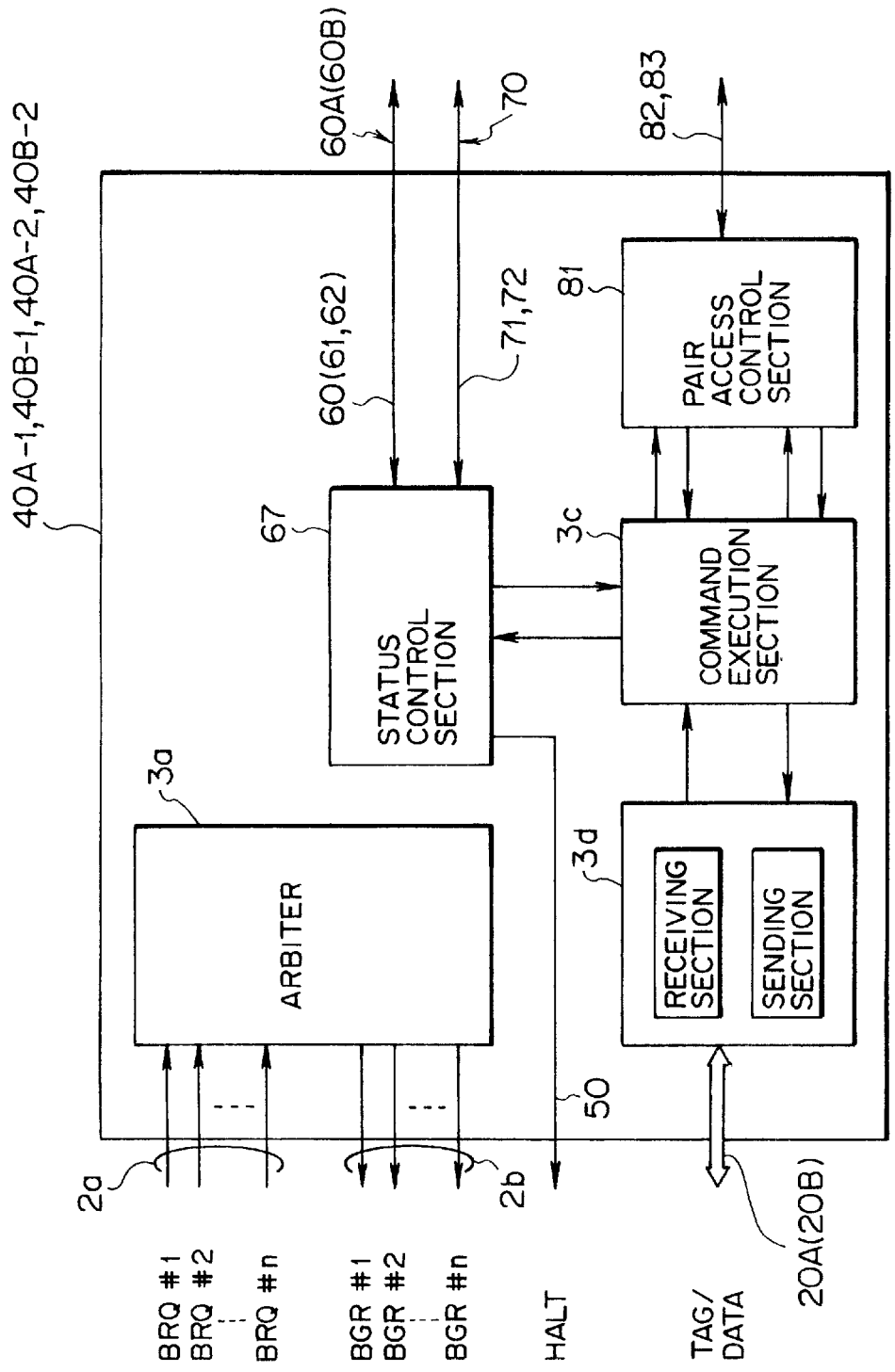
FIG. 4 is a block diagram showing the configuration of bus control mechanisms of the present embodiment.

FIG. 4 is a block diagram showing the configuration of the bus control mechanism of the present embodiment. As shown in FIG. 4, any one of the bus control mechanisms 40A-1, 40A-2, 40B-1, and 40B-2 of the present embodiment is comprised of the bus control mechanism status control section 67 previously described with reference to FIG. 3, the first notification means 60A or 60B, the inter-paired-module status notification lines 71 and 72 serving as the second notification means 70, and a pair access control section 81 (the inter-paired-module interface lines 82 and 83) as an access section, in addition to the arbiter 3a, the command execution section 3c, and the transceiver 3d that are the same members as included in the general bus control mechanisms 3A and 3B previously described with reference to FIG. 17. The same reference numerals are provided to designate the corresponding elements shown in FIG. 17, and therefore their explanations will be omitted here for brevity.

Like an example which will be described later with reference to FIG. 5, the second notification means 70 are made up of the two inter-paired-module status notification lines 71 and 72 that respectively connect the pair of bus control mechanisms 40A-1 and 40B-1 and the pair of bus control mechanisms 40A-2 and 40B-2. The state of the bus control mechanism is notified from the bus control mechanism 40A-1 (or 40A-2) to the bus control mechanism 40B-1 (or 40B-2) over the inter-paired-module status notification line 71, whilst the state of the bus control mechanism is notified from the bus control mechanism 40B-1 (or 40B-2) to the bus control mechanism 40A-1 (or 40A-2) over the inter-paired-module status notification line 72.

Like the example which will be described with reference to FIGS. 5 and 6, the pair access control section 81 controls access to the internal register of the counterpart bus control module in response to a command from each of the PMs 10 (practically in response to an instruction from the command execution section 3c). The pair of pair access control sections 81 of the bus control modules are connected with each other through the two inter-paired-module interface lines (serial interface lines) 82 and 83. The method of the connection of the interface lines 82 and 83 will be described later with reference to FIG. 6.

Figure 5:
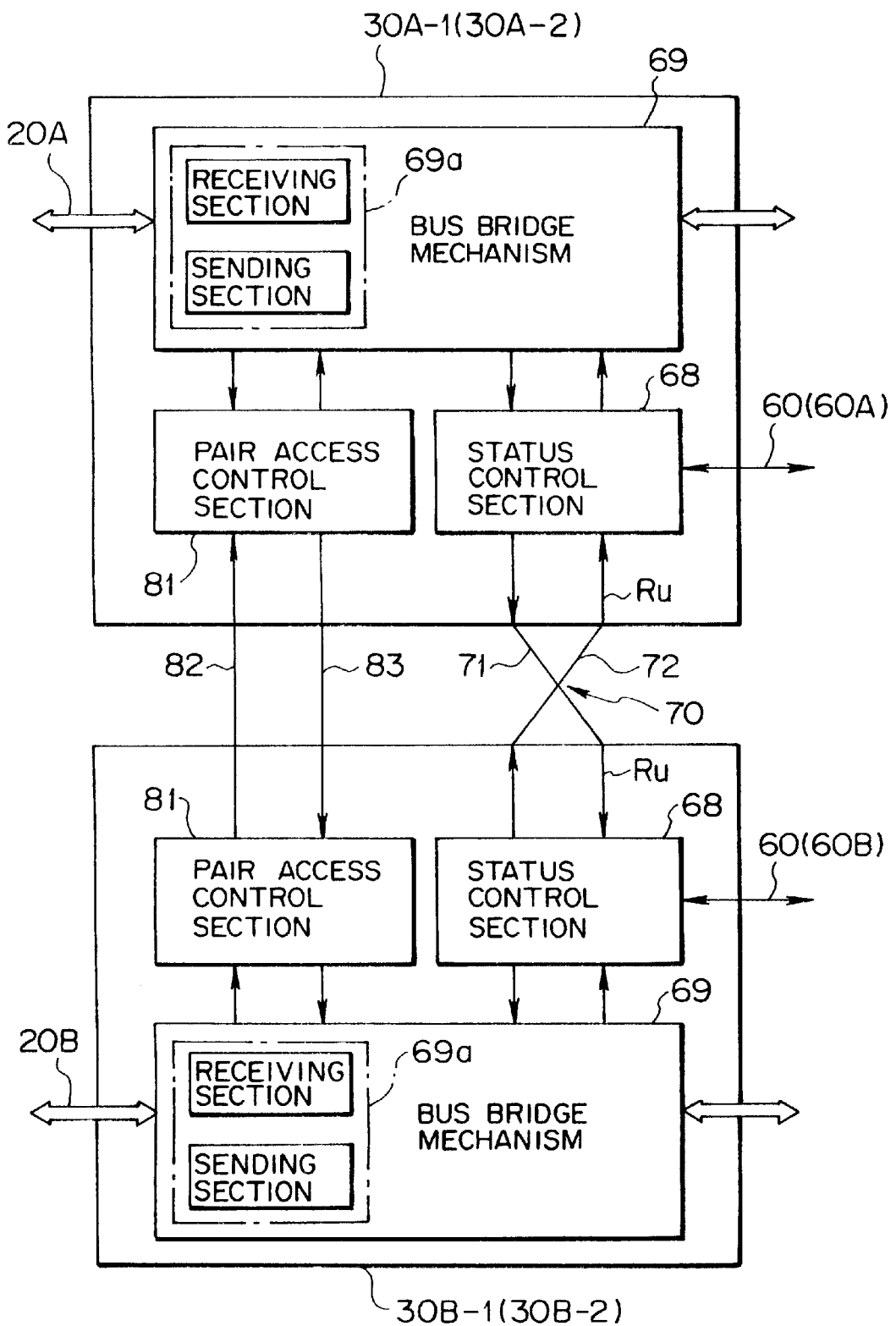
FIG. 5 is a block diagram showing the configurations of bus extender mechanisms, second notification means, and access section of the present embodiment.

FIG. 5 is a block diagram showing the configurations of the bus extender mechanism, the second notification means, and the access section of the present embodiment. FIG. 5 shows interconnections between the bus extender mechanisms 30A-1 and 30B-1 which form a pair of modules (or interconnections between the bus extender mechanisms 30A-2 and 30B-2). Similarly, the bus control mechanisms 40A-1 and 40B-1 are connected together as a pair of modules (or the bus control mechanisms 40A-2 and 40B-2 are connected together).

As shown in FIG. 5, any one of the bus extender mechanisms 30A-1, 30B-1, 30A-2, and 30B-2 of the present embodiment is made up of a bus bridge mechanism 69 for transmitting data between the physical buses 20A or 20B and another bus extender mechanism, the bus extender mechanism status control section 68 previously described with reference to FIG. 3, and the pair access control section 81 previously described with reference to FIG. 4.

In addition to the command execution section 3c previously described with reference to FIG. 17, the bus bridge mechanism 69 is provided with a transceiver section 69a for sending data to the physical bus 20A or 20B, as well as receiving data (such as a command from each PM 10) transmitted over the physical bus 20A or 20B.

The pair of bus extender mechanisms 30A-1 and 30B-1 and the pair of bus extender mechanisms 30A-2 and 30B-2 are respectively connected together by the two inter-paired-module status notification lines 71 and 72 that form the second notification means 70. The state of the bus extender mechanism is notified from the bus extender mechanism 30A-1 (or 30A-2) to the bus extender mechanism 30B-1 (or 30B-2) over the inter-paired-module status notification line 71, as well as the state of the bus extender mechanism being notified from the bus extender mechanism 30B-1 (or 30B-2) to the bus extender mechanism 30A-1 (or 30A-2) over the inter-paired-module status notification line 72.

In each of the bus extender mechanisms 30A-1, 30B-1, 30A-2, and 30B-2, either the input-side inter-paired-module status notification line 71 or 72 is connected to the pull-up resistor Ru (logical value fixing section). When one of the paired modules is not connected to the inter-paired-module status notification line 71 or 72 (or is not attached), the signal flowing through the inter-paired-module status notification line 71 or 72 is pulled up by the pull-up resistor Ru. As a result of this, the signal inevitably becomes a logical value representing the counterpart module as being in an abnormal or halted state. Similarly, this pull-up resistor Ru is also connected to the input-side inter-paired-module status notification line 71 or 72 of each of the bus control mechanisms 40A-1, 40B-1, 40A-2, and 40B-2 previously described with reference to FIG. 4.

The pair access control sections 81 between the pair of bus extender mechanisms 30A-1 and 30B-1 and the pair of bus extender mechanisms 30A-2 and 30B-2 are connected together through the two inter-paired-module interface lines (the serial interface lines) 82 and 83. The method of the connection of these interface lines 82 and 83 will be described later with reference to FIG. 6.

As previously mentioned with reference to FIGS. 4 and 5, the inter-paired-module status notification lines 71 and 72 are connected between the status control section 67 or 68 of one of the paired bus control modules and the status control section 67 or 68 of the counterpart bus control module via the back panel.

At this time, when the bus control modules themselves are operable, signals transmitted over the inter-paired-module status notification lines 71 and 72 turn into a low logic level.

The inter-paired-module status notification line 71 or 72 is connected to the pull-up resistor Ru in the bus control module which receives a signal from the inter-paired-module status notification line 71 or 72. Accordingly, when one of the pair of modules is removed from the multiprocessor system, the signal transmitted over the inter-paired-module status notification line 71 or 72 becomes a high logic level (that is, disabled).

In this way, the signal transmitted over the inter-paired-module status notification line 71 or 72 is retained as bit information representing a pair module status (PMS) in a read register (the internal register) for status display purposes disposed in the destination-side bus control module, in the manner as will be described with reference to FIG. 10(b). An interface and access between the pair of modules will now be described one by one.

Figure 6:
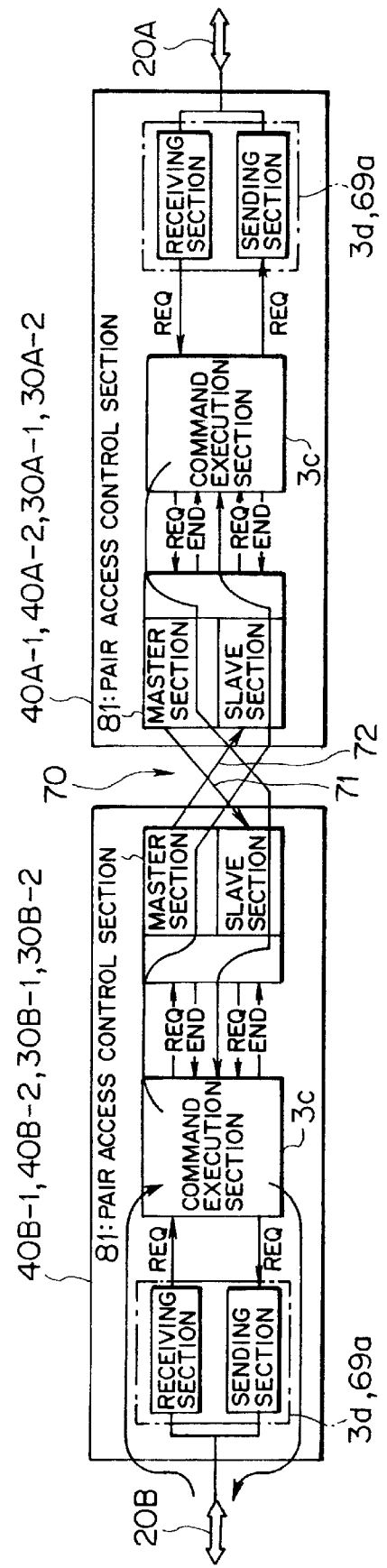
FIG. 6 is a block diagram for illustrating access and an interface between a pair of modules of the present embodiment.

FIG. 6 is a block diagram for illustrating an interface and access between the pair of modules of the present embodiment. For the purpose of ensuring an advantage in implementation and minimizing an interface between the pair of modules, in the present embodiment, the pair access control sections 81, 81 of each pair of modules are connected together by two serial interface lines, that is, inter-paired-module interface lines 71 and 72 in the same manner as previously mentioned. As further shown in FIG. 6, each of the interface lines 71, 72 fixedly connects a master portion of the pair access control section 81 of one bus control module with a slave portion of the pair access control section 81 of the other bus control module. In this way, since the pair access control sections 81, 81 of the pair of modules are fixedly connected together by the two interface lines 71, 72, it is possible to execute access processing between the pair of modules without the need of special arbitration.

For example, as shown in FIG. 6, when the command execution section 3c of the bus control module receives an access command from the PM 10 and judges that the command is a command for making access to the counterpart module, the command execution section 3c of the bus control module issues an access request signal REQ and activates the pair access control section 81. The activated pair access control section 81 starts transmission of data from the master portion to the inter-paired-module interface line 71 or 72.

When the slave portion of the receiving pair access control section 81 receives the data, the command execution section 3c of this bus control module is activated. After the completion of the receipt of the data, the activated command execution section 3c notifies the pair access control section 81 of the completion of the data transmission by issuing a completion signal END. Upon receipt of the complete acknowledgement, the pair access control section 81 sends status information and read data from its master portion back to the bus control module at the sending end over the inter-paired-module interface line 72 or 71.

After the transmission of the access command, the sending pair access control section 81 has been brought to rest in preparation for the receipt of the status information transmitted from the receiving end. Upon receipt of the status information, the pair access control section 81 delivers the result of the receipt of the status information (that is, a completion signal END), and read data at the time of a read access, to the command execution section 3c that originally activated the pair access control section 81. When received the status information, the command execution section 3c sends a response command back to the PM 10 via the system bus 20 (the physical buses 20A and 20B).

Figure 7:
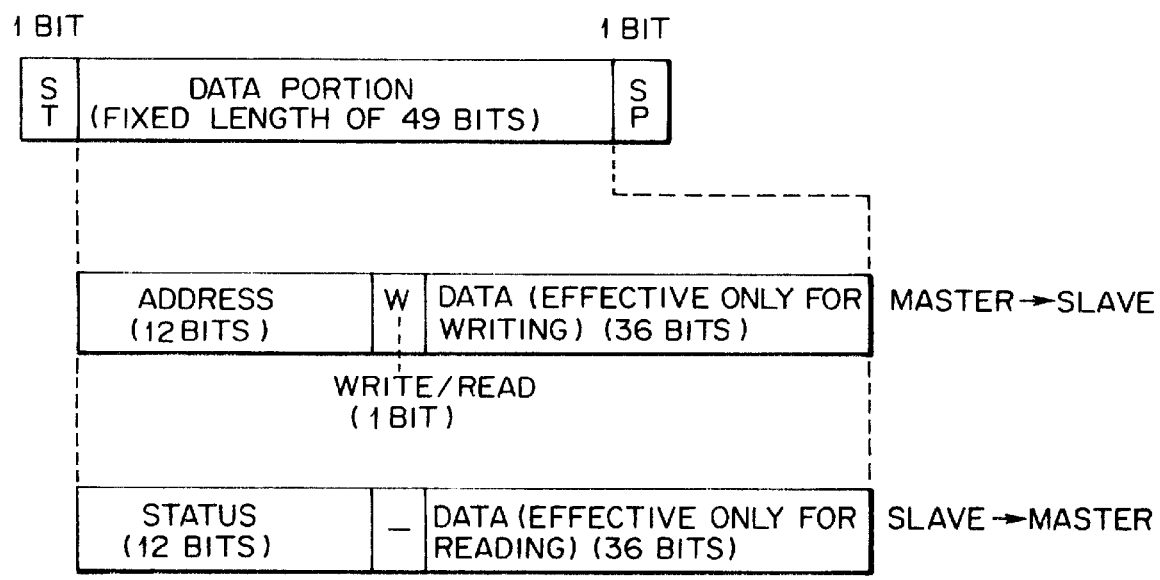
FIG. 7 is a schematic representation showing the format of data transmitted between the pair of modules of the present embodiment.

FIG. 7 is a schematic representation showing a data format used for transmission between each pair of modules in the present embodiment. In the embodiment, the transmission of data between the pair of modules is effected by serial transmission, and the half-duplex start-stop synchronization is employed for the transmission. Accordingly, as designated by an upper row shown in FIG. 7, a one start bit ST for bit synchronization purposes is added to a data portion (fixed length of 49 bits) which is followed by a stop bit SP, thereby forming the transmission data.

As shown in a middle row in FIG. 7, the data portion is made up of address information (12 bits), write/read information W (1 bit), and write data (which comprise 36 bits and are effective only for writing operation) when the transmission data are sent from the master portion of the pair access control section 81. Further, as shown in a lower row in FIG. 7, the data portion is made up of status information (12 bits) and read data (which comprise 36 bits and are effective only for reading operation) when the transmission data are sent from the slave portion of the pair access control section 81.

FIGS. 8(*a*) and 8(*b*) are timing charts for illustrating an example of sending and receiving operation (synchronization of data transmission) carried out between a pair of modules of the present embodiment. As shown in FIG. 8(*a*), the master portion of the pair access control section 81 maintains its output at a low logic level and starts to transmit a start bit ST at the time of transmission of data (when "Master 0" becomes a high logic level). To effect the transmission of one bit, the master portion remains in the same level until its counter counts up to 16 (from 0 to F) and outputs the next data at the same time the counter is reset.

As shown in FIG. 8(*b*), when an edge detection flip-flop in the slave portion of the pair access control section that receives the data detects the rising edge of the start bit, a counter which operates at the same frequency as the counterpart module is re-started in order to sample data at the center (a data strobe point at which a count becomes "8") of each bit. In the present embodiment, a one bit length is divided into 16 segments, and data are sampled at the moment when the count value of the counter reaches 8.

FIGS. 9(*a*) and 9(*b*) are schematic representations for illustrating the transmission of data between the pair of modules (between the master portion and the slave portion) in the present embodiment, wherein FIG. 9(*a*) shows the state of the master portion and FIG. 9(*b*) shows the state of the slave portion.

As shown in FIGS. 9(*a*) and 9(*b*), the master and slave portions are in an inactive state (in a stopped state; STP) when the master and slave portions are not operated. In this state, the master portion brings the interface line 71 or 72 in a drive state, and the slave portion is in a receiving state.

In response to a request from the command execution section 3c in the same module, after having sent a command (that is, after having been in a CMD state), the master portion is brought into a status waiting state (a WTS state), so that the master portion becomes a drive state.

On the other hand, the slave portion enters a command receiving state (the CMD state) as a result of the detection of the start bit ST. After having detecting the stop bit SP, the slave portion executes the command (in an EXE state). As a result of the execution of the command, the slave portion enters a status state (STS). In this state, the slave portion changes to a transmission state. After the completion of the transmission of a status, the slave portion returns to a stop state (STP) and enters the receiving state again. Upon receipt of the status information, the master portion changes to a status check (CHK) state, and then returns to the stop (STP) state and enters the drive state again after the examination of result of the execution of the command has been completed.

Figure 10A:
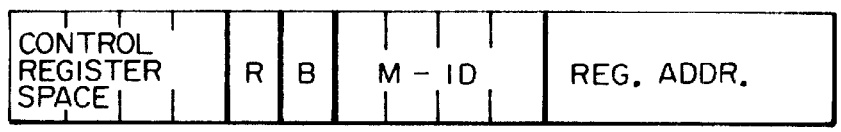
FIGS. 10(a) to 10(c) are schematic representations each illustrating the configuration of an internal register of the present embodiment.
Figure 10B:
Figure 10C:

FIGS. 10(*a*) to 10(*c*) are schematic representations for illustrating the configuration of the internal register of the present embodiment.

FIG. 10(*a*) is an explanatory view of the register. Registers of the bus control module are located at certain addresses as viewed from the operating system of the PM 10. The control register space shown in FIG. 10(*a*) depends on the system. The bus connecting sections 10A and 10B start to access the bus control module in accordance with contents included in a field of the control register space in the address.

In FIG. 10(*a*), "R" bit represents a remote/local (for determining whether to carry out remote access), and "B" represents a bus number (for determining which of the two physical buses 20A and 20B is used). Further, "M-ID" is a module identifier, and an ID of a module which should receive the command is set to this module identifier. Furthermore, a "REG-ADDR" field represents an address of a register to which access is made. The bus connecting sections 10A and 10B generate a command, address, and data which are transferred to the system bus 20 on the basis of these items of information set into the register shown in FIG. 10(*a*).

FIG. 10(*b*) shows a data format obtained when a status display register of the bus control module is read. In FIG. 10(*b*), "STATUS" represents the state of a module to which access is made, and "PMS" represents a bit representing the state of the counterpart module. It is possible to identify from the bit "PMS" whether or not the counterpart module is operable.

FIG. 10(*c*) shows a format for writing data into the register which controls the bus control module. The contents of control are included in a CONTROL section shown in FIG. 10(*c*).

Figure 11:
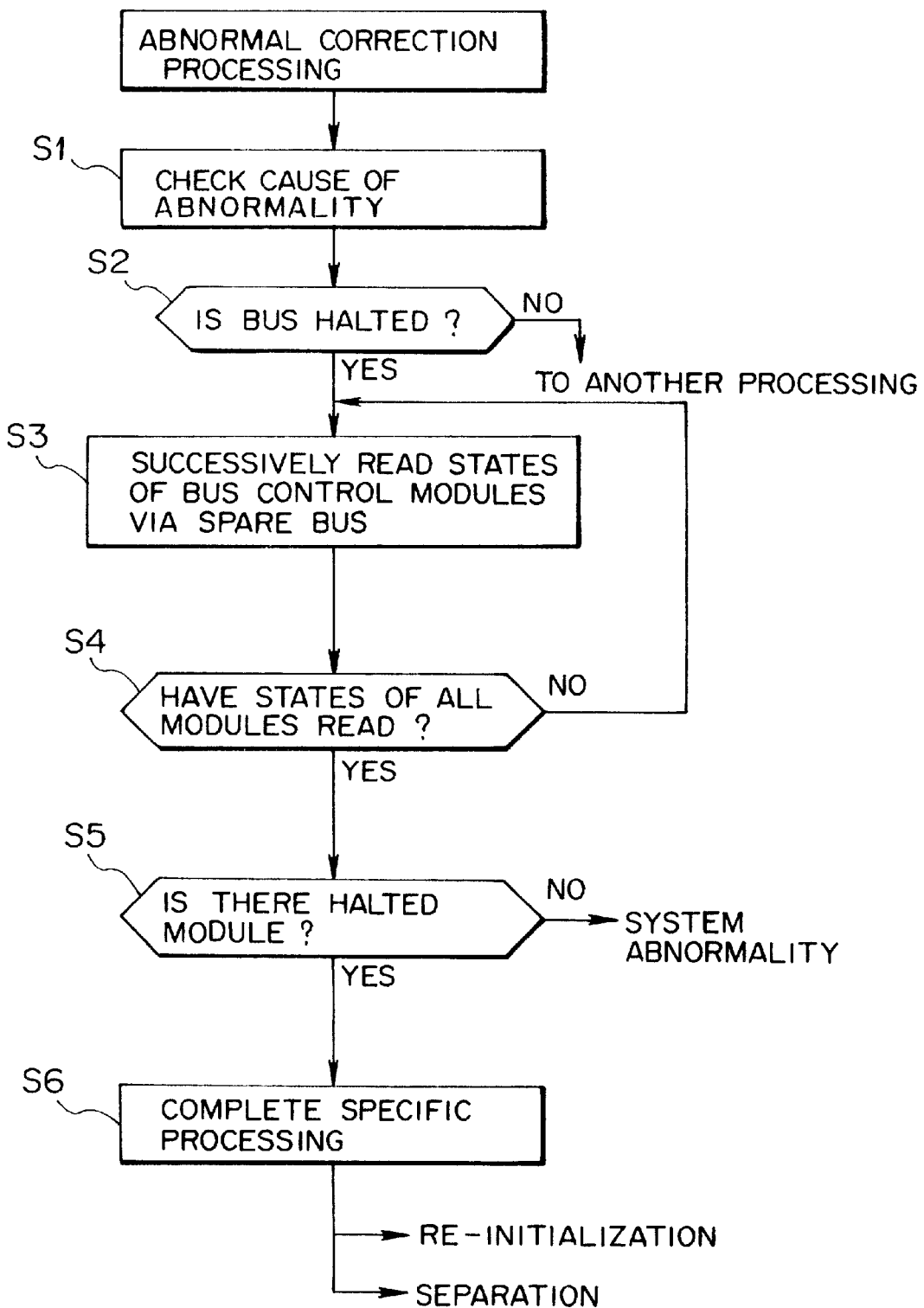
FIG. 11 is a flowchart for illustrating processing (abnormality correction processing) performed when a bus failure arises in the present embodiment.

FIG. 11 is a flowchart for explaining processing (abnormality correction processing) to be performed when a bus failure arises in this embodiment. The flowchart shown in FIG. 11 is an abnormality correction processing routine to be executed when the operating system of a PM 10 detects an abnormality, and the cause of the abnormality is first checked (step S1).

As a result of this check, unless the cause of abnormality is the halt of the main bus (i.e., the fact that the main bus is in a HALT state), that is, either the physical bus 20A or 20B (if a negative decision (No) is obtained in step S2), the processing proceeds to a processing for each cause. However, when the abnormality was caused by the halt of the main bus, that is, the physical bus 20A or 20B (if a positive decision (YES) is obtained in step S2), the states of the bus control modules that form the system bus 20 are read one by one through the spare bus, i.e., the remaining physical bus 20B or 20A, whereby the states of the modules connected to the halted main bus are checked (step S3).

At the moment the check of all the modules has been completed (a positive decision (YES) is obtained in step S4), the bus failure is dealt as being an evident abnormality, for example, a system failure, when the halted module does not exist (if a negative decision (NO) is obtained in step S5), as a result of which the overall system is brought into a halt.

On the other hand, when a halted module exists (if a positive decision (YES) is obtained in step S5), recovery processing corresponding to the faulty module or the state of the module is attempted (step S6).

One of the recovery attempts is to reuse the identified module. Specifically, the operating system resets the identified module by way of the pair of modules. The reset module starts operation by resetting the overall state thereof to the initial value, and hence the module can recover from the failure when the abnormality is an intermittent failure. The other recovery attempt is to replace the identified module with a new module. After issuing a separation instruction to the multiprocessor system to prevent the system from failing to work properly when the identified module is replaced, the operating system request the operator to replace the module. After the replacement of the module, the newly attached module starts to operate from its reset state, and hence the module, thereafter, follows the same processing as in the case where the module is used again.

Figure 12:
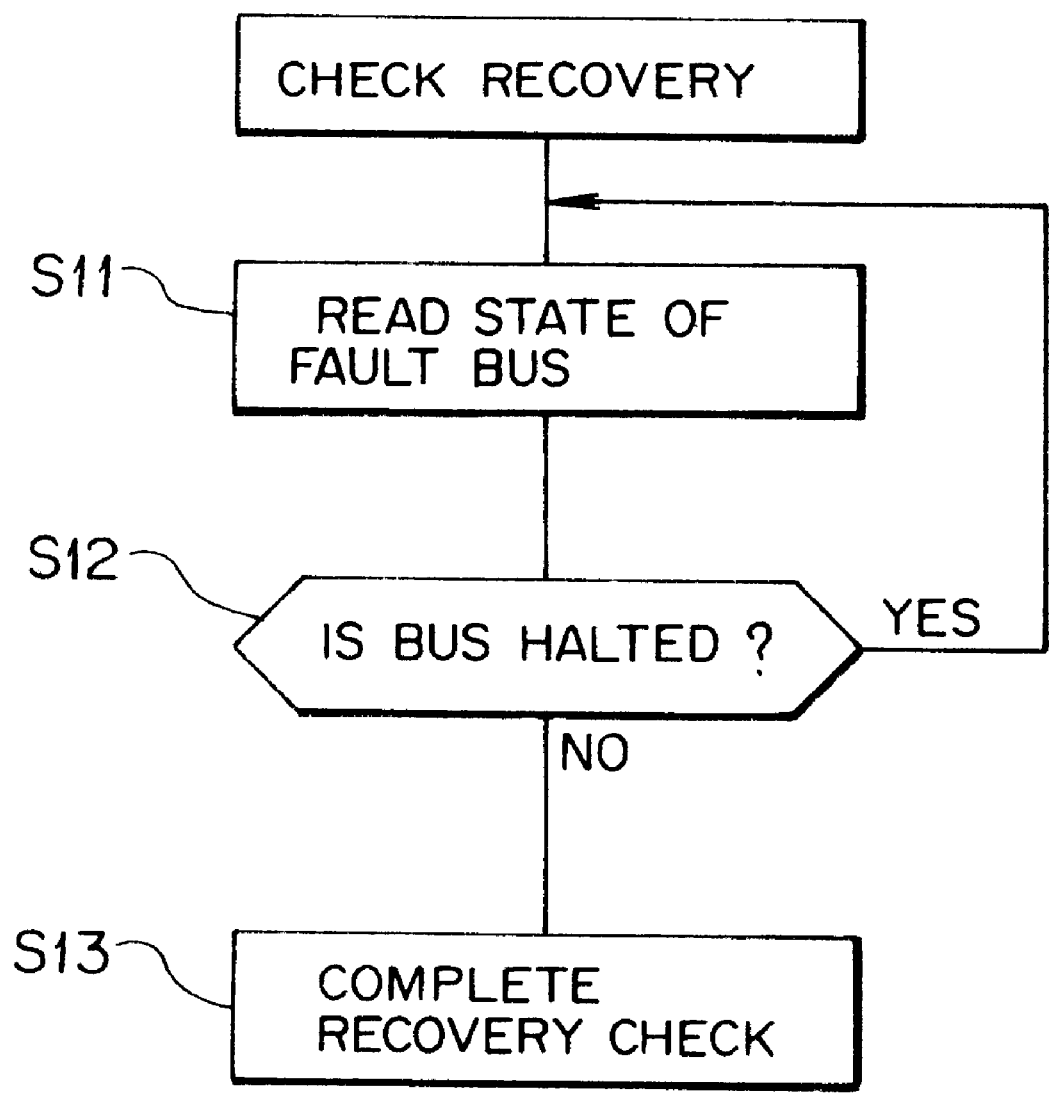
FIG. 12 is a flowchart for illustrating processing (recovery confirmation) performed when a bus failure arises in the present embodiment.
Figure 13:
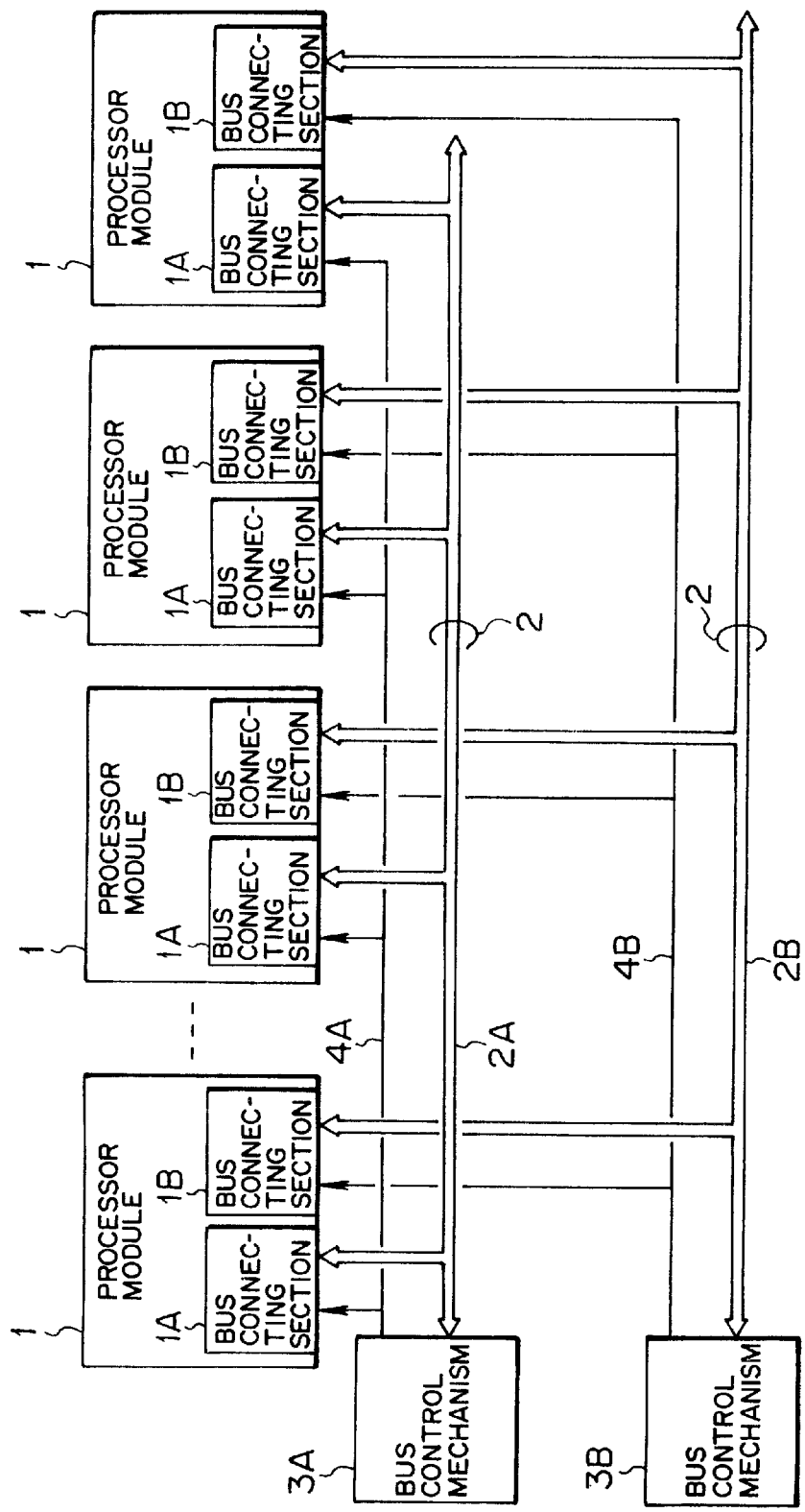
FIG. 13 is a block diagram showing an example of the configuration of a general multiprocessor system.
Figure 14:
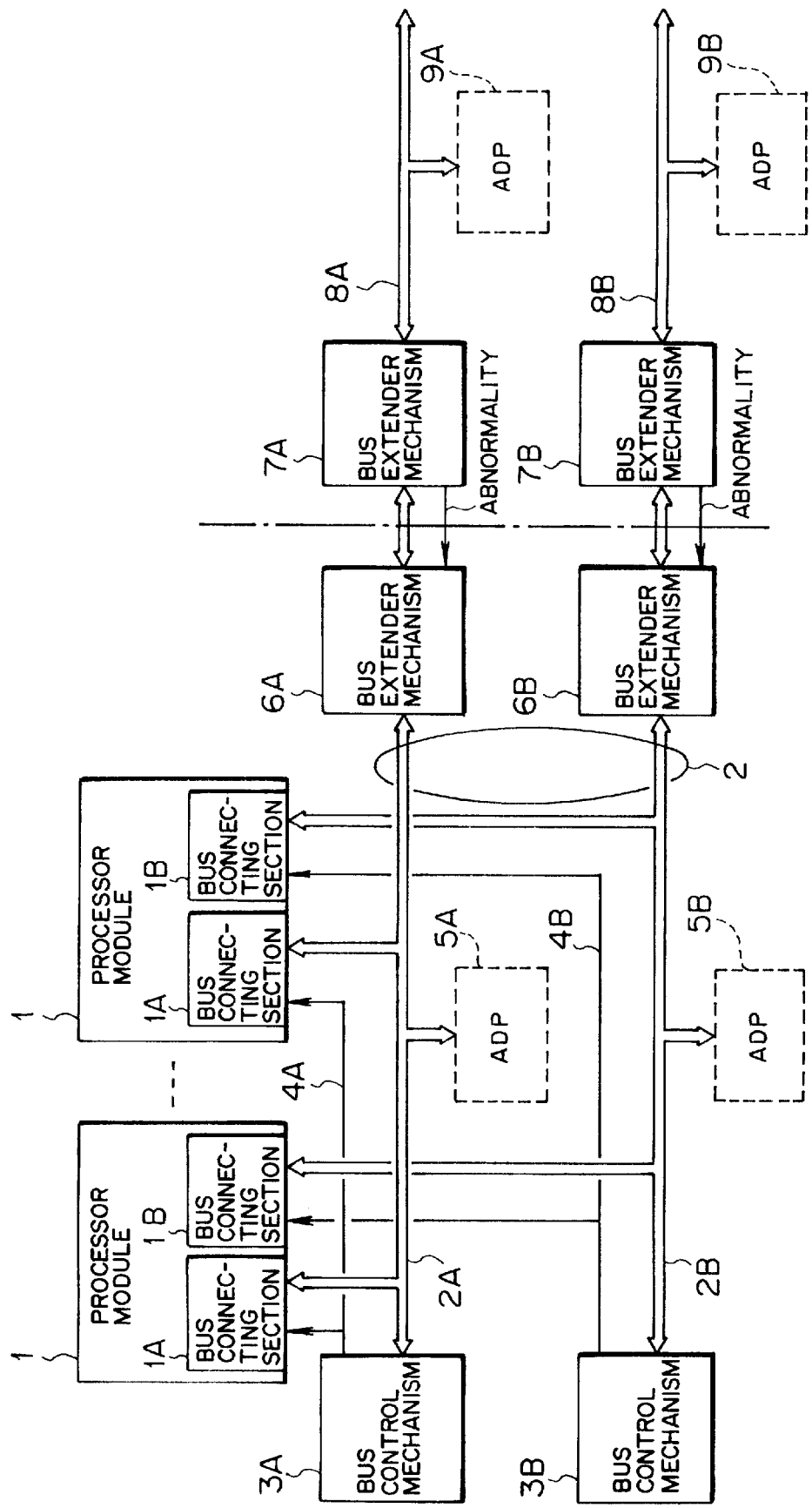
FIG. 14 is a block diagram showing an example of the extension of a system bus in the general multiprocessor system.
Figure 15:
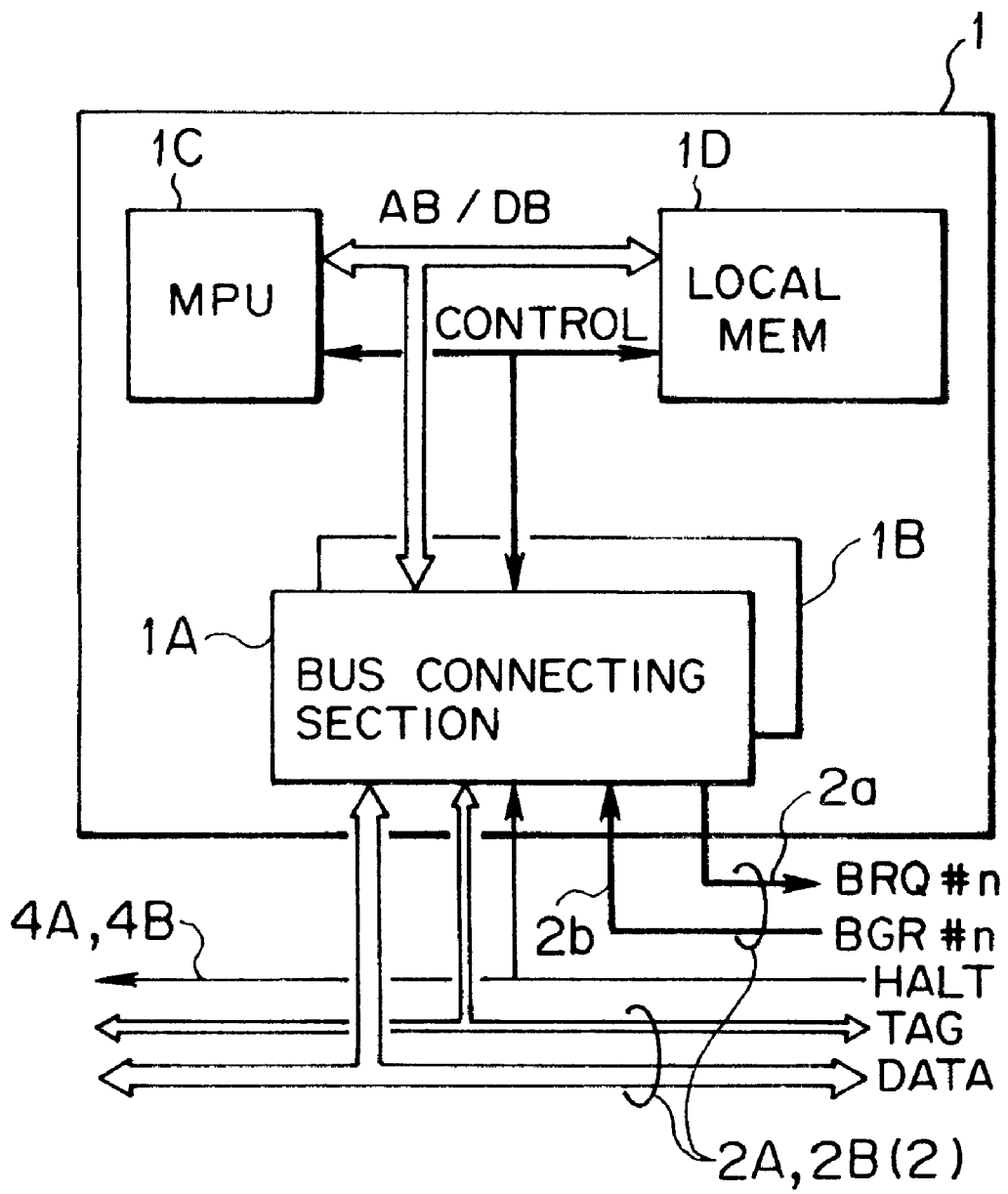
FIG. 15 is a block diagram showing the configuration of a general processor module.
Figure 16:
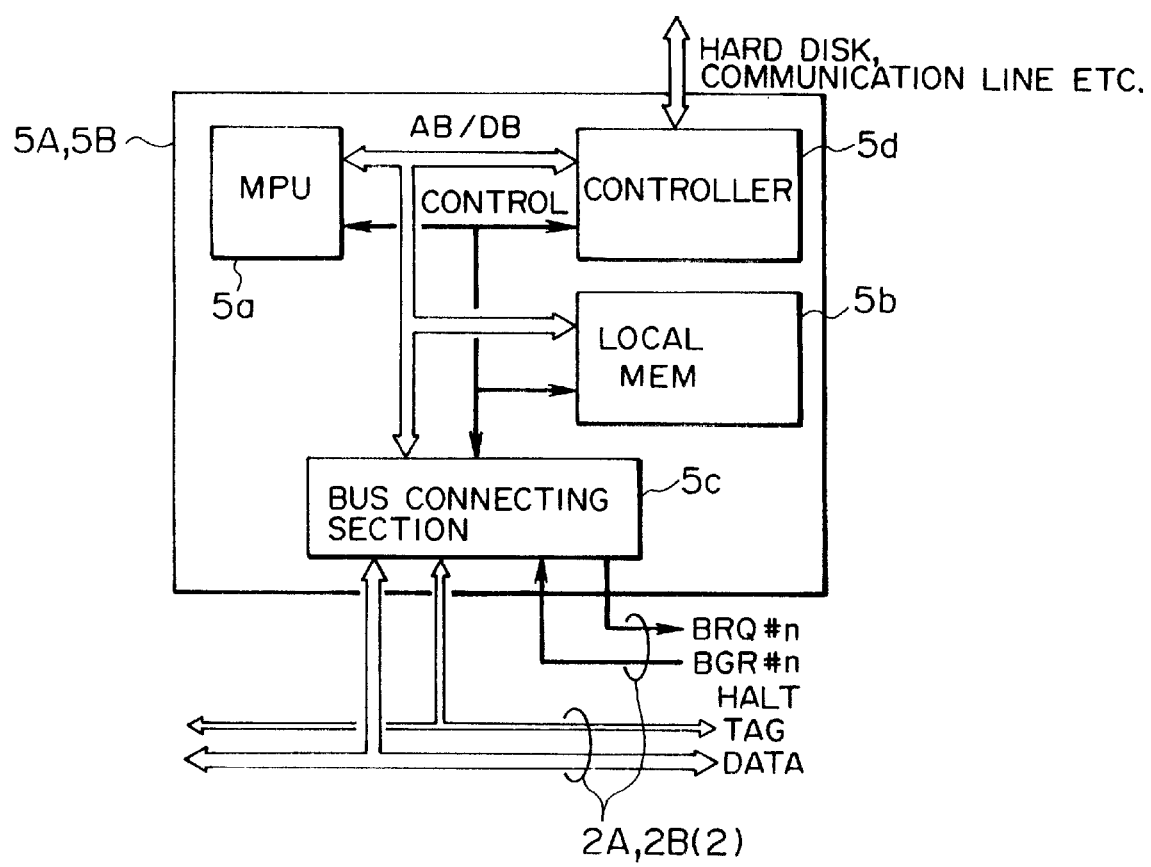
FIG. 16 is a block diagram showing an example of the configuration of a general adaptor.

FIG. 12 is a flowchart for illustrating recovery check processing after the occurrence of the bus failure. The operating system periodically repeats recovery check operation such as shown in FIG. 12 by, for example, a timer. In other words, in order to know the recovery of the bus failure, the operating system reads the state of the halted physical bus (faulty bus) 20A or 20B (step S11).

Even when the physical buses 20A and 20B are divided into a plurality of segments in the same manner as in the present embodiment, the states of the physical buses 20A and 20B represent the states of all the bus control modules. Accordingly, when the faulty bus is released from the HALT state (if a negative decision (NO) is obtained in step S12), the recovery of the faulty bus is checked (step S13), so that the periodic reading of the state of the physical bus is terminated.

In this way, according to one embodiment of the present invention, an abnormality occurred in each bus control module is notified to all the other bus control modules by the first notification means 60A and 60B. By virtue of this, when a part of the bus control modules detects an abnormality and the operation of the bus control module that detected the abnormality is halted, all the bus control modules on the divided system bus 20 can receive the same bus status information. Therefore, the system bus 20 can be divided utilizing the current operating system resources, and the system performance can be considerably improved as a result of an increased bus clock speed.

A logical sum between the state of each bus control module and the state of the bus control module in the preceding stage is notified to the bus control module in the succeeding stage by the inter-bus control module notification line 60. As a result of this, it is possible to reliably transmit the state of each bus control module to all the bus control modules. At this time, the logical sum is transmitted to the bus control module in the succeeding stage irrespective of the operating clock of the bus control module. Further, the status transmission is bidirectionally performed over the forward notification line 61 and the backward notification line 62, which enables faster and further reliable transmission of statuses between the bus control modules.

Each of the bus control modules is provided with the pull-up resistor Ru. By virtue of this resistor, when the multiprocessor system is not provided with a circuit board which forms the bus control module in the preceding stage resulting form the removal of that circuit board from a back panel, each of the bus control modules will judge the bus control module in the preceding stage as being in an abnormal or halted state, which in turn allows the bus control modules to perform operation corresponding to the judged state.

Further, the bus control module at the end (in the first stage) receives as an input signal, a logical value representing the bus control module in the preceding stage as being in a normal state, as a result of which the bus control module that is not actually present in the preceding stage is constantly judged as being normal. Therefore, an abnormal state resulting from the absence of the bus control module in the preceding stage can be reliably prevented from being transmitted to the bus control modules in the succeeding stages. In this way, the state of each bus control module can be reliably transmitted to the other bus control modules.

Furthermore, when the input signals synchronized by the synchronization circuits 65, 66 are the logical value that represents an abnormal or halted state, the status control sections 67 and 68 temporarily bring the operation of the bus control module which is under the control of each of the status control sections 67 and 68 into a halted state. On the other hand, when the synchronized input signals return to the logical value that represents normality after the temporal halt of the operation of the bus control module, the operation of the halted bus control module is resumed by the status control sections 67, 68. As a result of this, it is possible to automatically stop or resume the operation of each bus control module in accordance with the occurrence of an abnormality and the elimination of that abnormality.

On the other hand, when one physical bus 20A or 20B (i.e., the main bus) of the duplicated system bus is in a halted state, it is possible to know the state of each bus control module on the halted physical bus by way of the other physical bus 20B or 20A (i.e., the spare bus) and the bus control modules on that bus. For this reason, it is possible to easily identify the bus control module that brought the system bus to a halted state. In addition, it is also possible to check or determine the recovery of the identified bus control module in response to the release of the system bus 20 from the halted state, as well as being possible to initialize or separate the thus identified bus control module.

In other words, when either the overall physical bus 20A or 20B comes to a halted state resulting from the occurrence of a failure in a part of the bus control modules, it is possible to identify or control the bus control module that brought the physical bus to a halted state by making access to the remaining physical bus 20B or 20A. In this way, the divided system bus is implemented utilizing the current operating system resources and retaining high reliability and fault tolerant performance, whereby considerably improved performance can be realized as a result of an increased bus clock speed.

In this case, the PMS bit of the internal register of each bus control module retains the state of the counterpart module, and hence it is possible to easily and reliably grasp the state of the counterpart module without making access to the counterpart module.

Further, each of the bus control modules is provided with the pull-up resistor Ru. By virtue of this, when the multiprocessor system is not provided with a circuit board serving as a counterpart module as a result of the removal of the circuit board from the back panel, the counterpart module is judged as being in an abnormal or halted state, which allows each bus control module to carry out operation corresponding to the abnormal state.

The pair access control sections 81, 81 of the pair of modules are fixedly connected together by the two inter-paired-module interface lines 82, 83, and hence access can be made between the pair of modules without the need of arbitration, and the system configuration can be further facilitated.

In the above embodiment, the descriptions have been given of the system bus 20 divided into the two segments 20-1 and 20-2. However, the present invention is not limited to the present embodiment but similarly applied to other types of system bus comprising three or more segments. It is needless to say that similar operation and advantageous results can be obtained even in such a case.

What is claimed is:

1. A multiprocessor system including a plurality of processor modules which are equivalent to each other and are connected together by a duplicated system bus, said multiprocessor system comprising:

at least one bus extender mechanism by which a plurality of divided segments of said duplicated system bus are coupled together;

a bus control mechanism provided for each of physical buses which form each of said divided segments and adapted to control the states of said physical buses;

a bus status notification line for notifying the state of each physical bus controlled by a corresponding one of said bus control mechanisms to processor modules which are connected to the physical bus controlled by the corresponding one of said bus control mechanisms; and first notification means for notifying the state of each mechanism to other mechanisms among said bus control mechanisms and said at least one bus extender mechanism.

2. The multiprocessor system as defined in claim 1, wherein the first notification means comprises:

an inter-mechanism notification line for connecting said bus control mechanisms with said bus extender mechanism in series and for allowing the transmission of the state of each mechanism to an adjacent mechanism; and a logical OR circuit provided in each of said bus control mechanisms and said bus extender mechanism for calculating a logical sum between the state of each of said mechanisms and the state of a mechanism in the preceding stage transmitted through said inter-mechanism notification line and sending the thus calculated logical sum to a mechanism in the succeeding stage through said inter-mechanism notification line.

3. The multiprocessor system as defined in claim 2, wherein the logical sum produced by said logical OR circuit is sent to the mechanism in the succeeding stage irrespective of an operating clock of each mechanism through said inter-mechanism notification line.

4. A multiprocessor system including a plurality of processor modules which are equivalent to each other and are connected together by a duplicated system bus, said multiprocessor system comprising:

at least one bus extender mechanism by which a plurality of divided segments of said duplicated system bus are coupled together;

a bus control mechanism provided for each of physical buses which form each of said divided segments and adapted to control the states of said physical buses;

a bus status notification line for notifying the state of each physical bus controlled by a corresponding one of said bus control mechanisms to processor modules which are connected to the physical bus controlled by the corresponding one of said bus control mechanisms; and first notification means for notifying the state of each mechanism to other mechanisms among said bus control mechanisms and said at least one bus extender mechanism, wherein the first notification means comprises:

an inter-mechanism notification line for connecting said bus control mechanisms with said bus extender mechanism in series and for allowing the transmission of the state of each mechanism to an adjacent mechanism; and a logical OR circuit provided in each of said bus control mechanisms and said bus extender mechanism for calculating a logical sum between the state of each of said mechanisms and the state of a mechanism in the preceding stage transmitted through said inter-mechanism notification line and sending the thus calculated logical sum to a mechanism in the succeeding stage through said inter-mechanism notification line, wherein said inter-mechanism notification line is made up of a forward notification line for transmitting the state of each mechanism to each of the mechanisms in a predetermined order and a backward notification line for transmitting the state of each mechanism to each of the mechanisms in a reversed order in relation to the predetermined order.

5. A multiprocessor system including a plurality of processor modules which are equivalent to each other and are connected together by a duplicated system bus, said multiprocessor system comprising:

at least one bus extender mechanism by which a plurality of divided segments of said duplicated system bus are coupled together;

a bus control mechanism provided for each of physical buses which form each of said divided segments and adapted to control the states of said physical buses;

a bus status notification line for notifying the state of each physical bus controlled by a corresponding one of said bus control mechanisms to procesor modules which are connected to the physical bus controlled by the corresponding one of said bus control mechanisms; and first notification means for notifying the state of each mechanism to other nechanisms among said bus control mechanisms and said at least one bus extender mechanism, wherein the first notification means comprises:

an inter-mechanism notification line for connecting said bus control mechanisms with said bus extender mechanism in series and for allowing the transmission of the state of each mechanism to an adjacent mechanism; and a logical OR circuit provided in each of said bus control mechanisms and said bus extender mechanism for calculating a logical sum between the state of each of said mecbanisms and the state of a mechanism in the preceding stage transmitted through said inter-mechanism notification line and sending the thus calculated logical sum to a mechanism in the succeeding stage through said inter-mechanism notification line, wherein each of said bus control mechanisms and said bus extender mechanism comprises logical value fixing means which fixes an input signal received from said inter-mechanism notification line at a logical value representing that the mechanism in the preceding stage is in an abnormal or halted state, when the mechanism in the preceding stage is not connected to said inter-mechanism notification line.

6. A multiprocessor system including a plurality of processor modules which are equivalent to each other and are connected together by a duplicated system bus, said multiprocessor system comprising:

at least one bus extender mechanism by which a plurality of divided segments of said duplicated system bus are coupled together;

a bus control mechanism provided for each of physical buses which form each of said divided segments and adapted to control the states of said physical buses;

a bus status notification line for notifying the state of each physical bus controlled by a corresponding one of said bus control mechanisms to processor modules which are connected to the physical bus controlled by the corresponding one of said bus control mechanisms; and first notification means for notifying the state of each mechanism to other mechanisms among said bus control mechanisms and said at least one bus extender mechanism, wherein the first notification means comprises:

an inter-mechanism notification line for connecting said bus control mechanisms with said bus extender mechanism in series and for allowing the transmission of the state of each mechanism to an adjacent mechanism; and a logical OR circuit provided in each of said bus control mechanisms and said bus extender mechanism for calculating a logical sum between the state of each of said mechanisms and the state of a mechanism in the preceding stage transmitted through said inter-mechanism notification line and sending the thus calculated logical sum to a mechanism in the succeeding stage through said inter-mechanism notification line, wherein a mechanism, which is located at the end of the line of said bus control mechanisms and said bus extender mechanism connected in series by said inter-mechanism notification line, has a structure for fixing an input signal from said inter-mechanism notification line at a logical value representing that the mechanism in the preceding stage is in a normal state.

7. A mutiprocessor system including a plurality of processor modules which are equivalent to each other and are connected together by a duplicated system bus, said multiprocessor system comprising:

at least one bus extender mechanism by which a plurality of divided segments of said duplicated system bus are coupled together;

a bus control mechanism provided for each of physical buses which form each of said divided segments and adapted to control the states of said physical buses;

a bus status notification line for notifying the state of each physical bus controlled by a corresponding one of said bus control mechanisms to processor modules which are connected to the physical bus controlled by the corresponding one of said bus control mechanisms; and first notification means for notifying the state of each mechanism to other mechanisms among said bus control mechanisms and said at least one bus extender mechanism, wherein the first notification means comprises:

an inter-mechanism notification line for connecting said bus control mechanisms with said bus extender mechanism in series and for allowing the transmission of the state of each mechanism to an adjacent mechanism; and a logical OR circuit provided in each of said bus control mechanisms and said bus extender mechanism for calculating a logical sum between the state of each of said mechanisms and the state of a mechanism in the preceding stage transmitted through said inter-mechanism notification line and sending the thus calculated logical sum to a mechanism in the succeeding stage through said inter-mechanism notification line, wherein each of said bus control mechanisms and said bus extender mechanism comprises:

a synchronization circuit for synchronizing a signal received from said inter-mechanism notification line with an operating clock of each mechanism; and a status control section which temporarily stops the operation of the mechanism including said status control section when the input signal synchronized by said synchronization circuit becomes a logical value representing an abnormal or halted state.

8. The multiprocessor system as defined in claim 7, wherein said status control section resumes the operation of a halted mechanism when an input signal synchronized by said synchronization circuit becomes a logical value representing a normal state after a temporal halt of the operation of the mechanism including said status control section.

9. A multiprocessor system including a plurality of processor modules which are equivalent to each other and are connected together by a duplicated system bus, said multiprocessor system comprising:

at least one bus extender mechanism by which a plurality of divided segments of said duplicated system bus are coupled together;

a bus control mechanism provided for each of physical buses which form each of said divided segments and adapted to control the states of said physical buses;

a bus status notification line for notifying the state of each physical bus controlled by a corresponding one of said bus control mechanisms to procesor modules which are connected to the physical bus controlled by the corresponding one of said bus control mechanisms; and first notification means for notifying the state of each mechanism to other mechanisms among said bus control mechanisms and said at least one bus extender mechanism, wherein each of said bus control mechanisms and said bus extender mechanism comprises:

second notification means for notifying the state of a mechanism including this second notification means to a counterpart mechanism resulting from the duplication of said system bus; and an access section for making access to an internal register of said counterpart mechanism in response to a command from each of said processor modules.

10. The multiprocessor system as defined in claim 9, wherein said internal register comprises a bit for retaining the state of said counterpart mechanism notified by said second notification means of said counterpart mechanism.

11. The multiprocessor system as defined in claim 9, wherein each of said bus control mechanisms and said bus extender mechanism comprises:

a logical value fixing section for fixing an input signal from said second notification means at a logical value representing that said counterpart mechanism is in an abnormal or halted state, when said counterpart mechanism does not exist.

12. The multiprocessor system as defined in claim 9, wherein said access section of said pair of mechanisms are connected together by two serial interface lines; and each of the serial interface lines fixedly connects a master portion of said access section of one of said pair of mechanisms with a slave portion of said access section of said other mechanism.

13. The multiprocessor system as defined in claim 9, wherein an operating system of each of said processor modules sends to each of said bus control mechanisms and said bus extender mechanism on a spare bus a command for reading information retained by said internal register of said counterpart mechanism, through said spare bus of the duplicated system bus, when said operating system detects an abnormal or halted state of a main bus of said duplicated system bus;

said access section of each mechanism that received the command accesses said internal register of said counterpart mechanism of said pair of mechanism in order to read data from said internal register, and the thus read data are transmitted to said operating system via said spare bus; and said operating system identifies a mechanism on said main bus that caused the abnormal or halted state on the basis of the data of the internal register transmitted from each of the mechanisms.

14. The multiprocessor system as defined in claim 13, wherein said operating system issues a command, through said spare bus, to a mechanism on said spare bus which is a counterpart of the mechanism identified as caused an abnormal or halted state so as to initialize or separate said identified mechanism; and said access section of the mechanism that received said command initializes or separates said identified mechanism.

15. The multiprocessor system as defined in claim 13, wherein said operating system monitors the state of said system bus which includes a mechanism defined as caused an abnormal or halted state, and judges that said identified mechanism has been recovered when release of said system bus from a halted state is confirmed.

* * * * *